US 6,751,347 B2

(12) United States Patent
Pettigrew et al.

(10) Patent No.: US 6,751,347 B2
(45) Date of Patent: Jun. 15, 2004

(54) COLOR DIAMOND CHROMA KEYING

(75) Inventors: Daniel Pettigrew, Ile Bizard (CA); Francois Paquin, Montreal (CA)

(73) Assignee: Autodesk Canada Inc., Quebec (CA)

( * ) Notice: Subject to any disclaimer, the term of this patent is extended or adjusted under 35 U.S.C. 154(b) by 560 days.

(21) Appl. No.: 09/765,878

(22) Filed: Jan. 18, 2001

(65) Prior Publication Data

US 2001/0028735 A1 Oct. 11, 2001

(30) Foreign Application Priority Data

Apr. 7, 2000 (GB) .............................. 0008473

(51) Int. Cl.⁷ .............................. G06K 9/00; G06K 9/06
(52) U.S. Cl. ........................................ 382/162; 382/276
(58) Field of Search .............................. 382/162, 164, 382/276, 282, 285, 291, 295, 305; 348/584, 586, 587, 590, 591, 592; 345/501, 530, 531, 634

(56) References Cited

U.S. PATENT DOCUMENTS

| 5,384,912 A | * | 1/1995 | Ogrinc et al. ............... 345/501 |
| 5,627,951 A | * | 5/1997 | Chaplin et al. ............. 345/601 |
| 5,812,214 A | * | 9/1998 | Miller ........................ 348/587 |
| 5,838,310 A | | 11/1998 | Uya ............................ 345/536 |
| 5,861,871 A | * | 1/1999 | Venable ...................... 708/200 |
| 5,923,791 A | * | 7/1999 | Hanna et al. ................ 382/295 |
| 6,011,595 A | * | 1/2000 | Henderson et al. ......... 348/590 |
| 6,020,931 A | * | 2/2000 | Bilbrey et al. .............. 348/584 |
| 6,335,765 B1 | * | 1/2002 | Daly et al. .................. 348/586 |
| 6,456,300 B1 | * | 9/2002 | Pettigrew ................... 345/634 |
| 6,496,599 B1 | * | 12/2002 | Pettigrew ................... 382/162 |
| 6,571,012 B1 | * | 5/2003 | Pettigrew ................... 382/167 |

FOREIGN PATENT DOCUMENTS

| GB | 2336054 A | 10/1999 | ............ H04N/9/75 |
| GB | 2336055 A | 10/1999 | ............ H04N/9/75 |
| GB | 2336056 A | 10/1999 | ............ H04N/9/75 |
| WO | WO 98/10586 | 3/1998 | ............ H04N/5/765 |

* cited by examiner

*Primary Examiner*—Andrew W. Johns
*Assistant Examiner*—Amir Alavi
(74) *Attorney, Agent, or Firm*—Gates & Cooper LLP

(57) ABSTRACT

A process of defining a color volume for use in a process of color keying, in which a foreground image (405) is composited against a background image (407). The foreground image (405) contains regions of a background color (723). The user defines diamond shaped areas (611, 621) in PbPr color dimensions, and luminance ranges (612, 622). Tolerance and softness volumes (613, 623) are defined in this way, and a transformation is defined for each. Foreground pixels are processed (602) to determine a background, foreground, or softness condition for a matte (406). Softness represents a partial mix of foreground and background. The mix level is calculated by re-centering (1201) the softness volume, and processing (1206) with an optional sharpness parameter (706).

30 Claims, 20 Drawing Sheets $Y' = 0.299N\,R + 0.587\,G + 0.114\,B$
$Pb = -0.169\,R - 0.331\,G + 0.5\,B$
$Pr = 0.5\,R - 0.419\,G - 0.081\,B$ MATRIX 'A' TRANSFORMS RGB TO Y'Pb Pr MATRIX 'A$^{-1}$' TRANSFORMS Y'Pb Pr TO RGB RGB BLACK = ( 0, 0, 0 );  Y'Pb Pr BLACK = ( 0, 0, 0 )
RGB WHITE = ( 1, 1, 1 );  Y'Pb Pr WHITE = ( 1, 0, 0 )

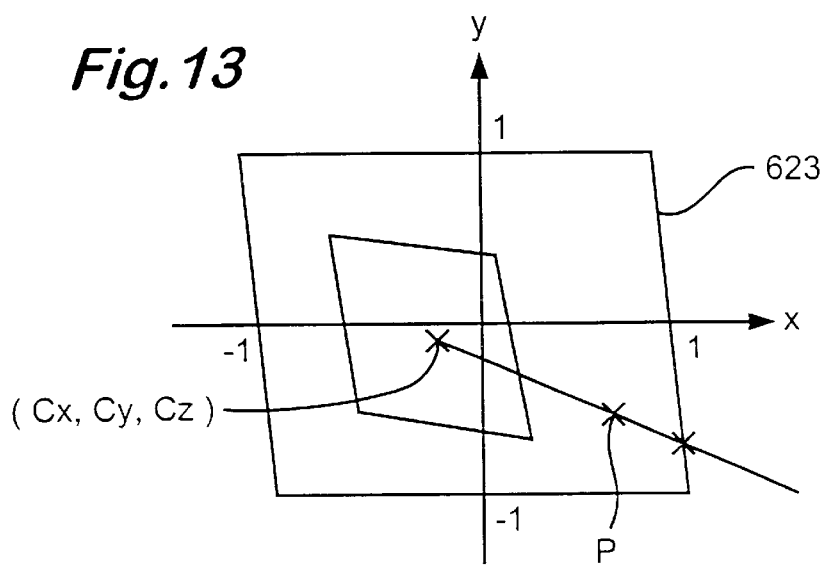

Fig. 13

IN NORMALISED TOLERANCE SPACE, TOLERANCE CENTRE IS AT (0, 0, 0)

IN RGB SPACE, TOLERANCE CENTRE IS OBTAINED FROM THE INVERSE OF mTolerance:

$$\begin{bmatrix} 0 \\ 0 \\ 0 \\ 1 \end{bmatrix} \cdot \text{mTolerance}^{-1}$$

EXPRESSION OF THESE CO-ORDINATES IN NORMALISED SOFTNESS SPACE IS OBTAINED USING mSoftness, AND THE ABOVE TRANSFORMATION CAN BE CONCATENATED TO OBTAIN (Cx, Cy, Cz) DIRECTLY:

$$\begin{bmatrix} 0 \\ 0 \\ 0 \\ 1 \end{bmatrix} \cdot \text{mTolerance}^{-1} \cdot \text{mSoftness}$$

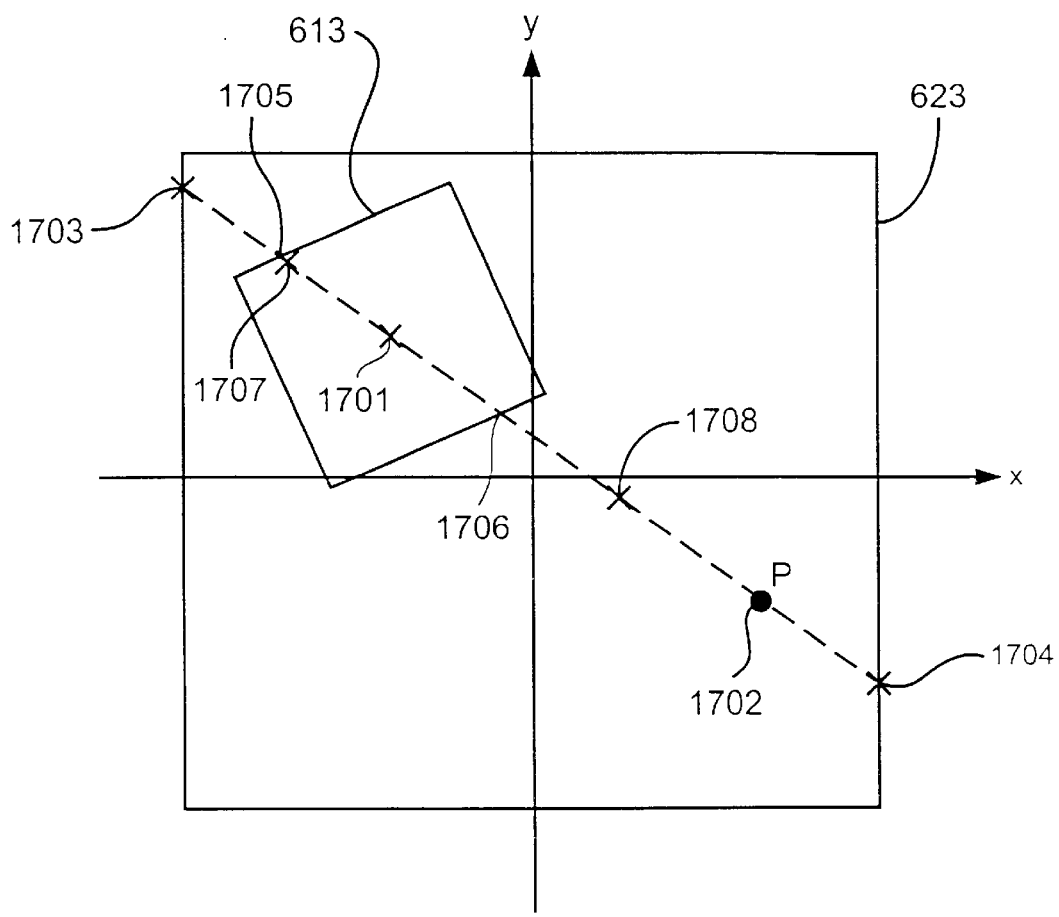
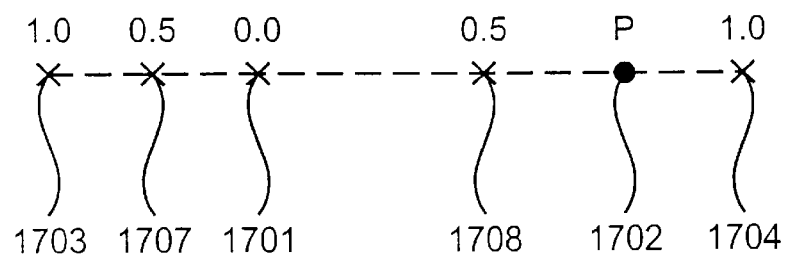
Fig.17

$$\text{MATTE} = \frac{\text{MAX\_S} - \left( \dfrac{\text{SHARPNESS} \cdot \text{MAX\_S}}{\text{MAX\_T}} \right)}{1.0 - \left( \dfrac{\text{SHARPNESS} \cdot \text{MAX\_S}}{\text{MAX\_T}} \right)}$$

WHERE  $0 \leq \text{SHARPNESS} \leq 1$
AND   $0 < \text{MATTE} < 1$

COLOR DIAMOND CHROMA KEYING

BACKGROUND OF THE INVENTION

1. Field of the Invention

The present invention relates to an apparatus for processing image data, a method of processing image data and a computer-readable medium.

2. Description of the Related Art

Color keying has seen widespread use in the video industry. In this process, talent is shot against a blue background. The blue background provides a key that is used to control a mixing process in which the foreground image is mixed with a background image. The result is that the talent appears to be in the environment of the background image.

Historical implementations of this technique have used analogue circuitry for the detection of the blue key, and in the mixing process. Early on, it was realised that a simple switch between foreground and background results in considerable distortion being visible at the edges of the foreground image. Practical techniques for defining a level of smooth variation from background to foreground were developed, still in the analogue domain, and which were found to be reasonably effective within the constraints of low-quality video.

With the advent of digital processing of image data, the possibility of controlling the gradual switch between foreground and background more accurately has attracted many highly technical solutions. In particular, the key color is defined by a volume in a color space. A tolerance volume encloses the background color, and this volume is itself enclosed by a softness volume. Any pixels whose color lies outside the softness volume are considered as belonging to the foreground. Intermediate regions, inside the softness volume but outside the tolerance volume, define a partial level of mixing between the foreground and background images.

This abstraction of the problem of color keying enables the computer programmer to define solutions of considerable flexibility. In one known system, the color volumes are defined by irregular polyhedrons having many dozens of sides. Unfortunately this level of complexity, while theoretically providing a solution to almost any keying problem, makes the task of the user impossibly difficult. Simpler solutions, on the other hand, fail to provide the level of quality that is required in today's digital film editing suites, where absolute realism is the intended aim.

BRIEF SUMMARY OF THE INVENTION

According to an aspect of the present invention, there is provided apparatus for processing image data, comprising storage means for storing instructions, memory means for storing said instructions during execution and image data including foreground image data, processing means for performing image processing in which said foreground image data may be analysed to generate matte values for controlling a keying process in which said foreground image is to be composited against background image data, and monitoring means for facilitating user interaction with said image processing, wherein said processing means is configured such that, in response to said instructions, said image data is processed by the steps of: receiving a user indication of a background color, said indication defining a color diamond in a plane of constant luminance, and a luminance range; defining a transformation in response to said user indication; and processing pixels of said foreground image with said transformation in order to identify a matte value.

BRIEF DESCRIPTION OF THE SEVERAL VIEWS OF THE DRAWINGS

FIG. 13 details the step of pre-calculating a centre shown in FIG. 12;

FIG. 17 illustrates the effect of adjusting values, as detailed in FIG. 16;

BEST MODE FOR CARRYING OUT THE INVENTION

The invention will now be described by way of example only with reference to the accompanying drawings.

Figure 1:
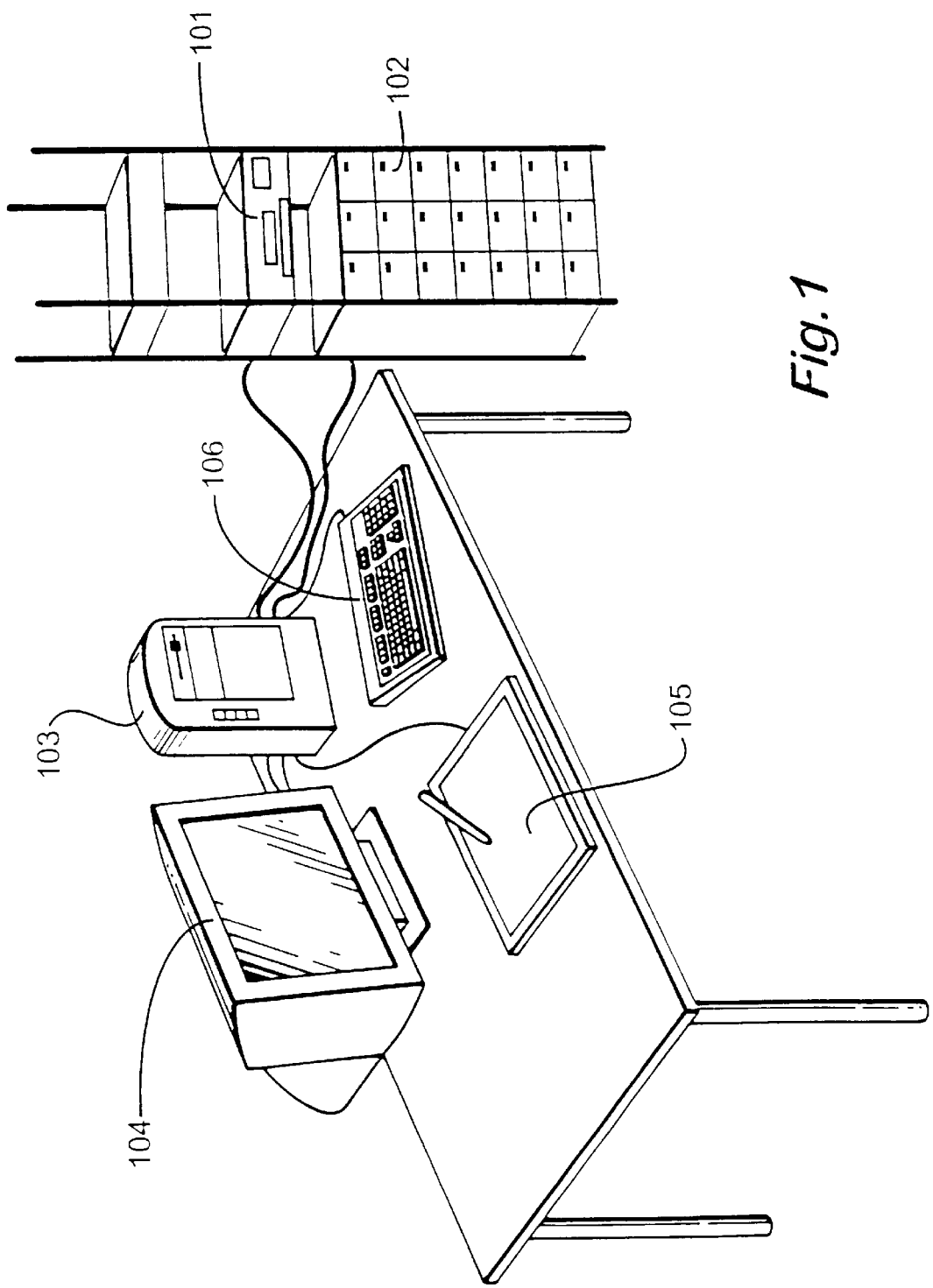
FIG. 1 shows an image processing system including a computer and a monitor.

A system for the processing of image data is illustrated in FIG. 1. A digital tape player 101 plays and records digital tapes having a high data capacity suitable for storing many frames of high definition image data. In preparation for image processing, images for a film clip are transferred from a tape in the tape player 101 to a frame store 102. The frame store 102 comprises several high capacity hard disk drives, arranged to supply and store image data in parallel across many individual drives at once. The hard disk drives are configured as a redundant array of inexpensive disks (RAID). Using the frame store 102, it is possible to play back and record high resolution film images at any location in a clip without having to wait for a tape wind mechanism to reach the required frame. Furthermore the frame store facilitates real time play and record of image data, when the amount of processing being performed is minimal, for example when previewing a stored clip.

A computer 103 facilitates the transfer of image data between the tape player 101 and the frame store 102. The computer 103 also facilitates the modification, processing and adjustment of image data to form an output clip that will eventually be stored onto digital tape. The computer is a Silicon Graphics Octane (TM). Images are previewed on a monitor 104 on which is also displayed a graphical user interface (GUI) to provide the user with several controls and interfaces for controlling the manipulation of image data. When processing image data, the user interacts with images and the graphical user interface displayed on the monitor 104 via a graphics tablet 105. For alphanumeric input, there is provided a keyboard 106, although facilities may be provided via the graphical user interface to facilitate occasional text input using the graphics tablet 105.

In addition to receiving image data from the tape player 101 and the frame store 102, the computer 103 may receive image and or other data over a network. The image processing system shown in FIG. 1 facilitates the manipulation of image data by a digital artist in order to achieve high quality special effects and processing of image data.

In a typical application, film clips are digitised and stored on digital tape for transfer to the system shown in FIG. 1. The film clips include several camera shots that are to be combined into the same scene. It is the task of the user or digital artist to combine and process this source image data into a single output clip that will be stored back onto tape for later transfer to film or video. Typical examples of this type of scene are where real images shot by a film camera are to be combined with artificially generated images and backgrounds, including scenes where actors are to be placed in computer-generated environments.

Figure 2:
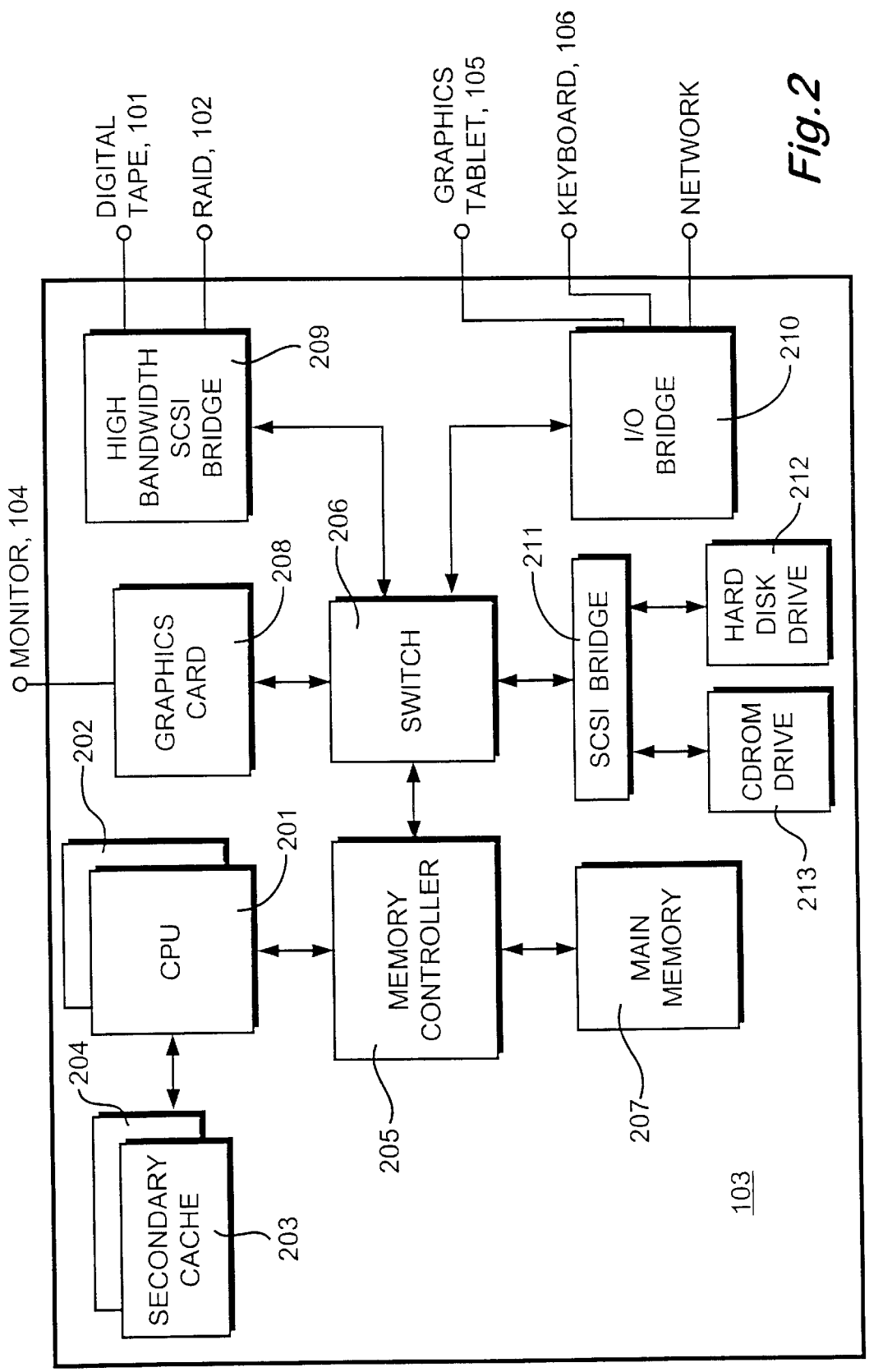
FIG. 2 details components of the computer shown in FIG. 1, including a main memory.

The computer 103 shown in FIG. 1 is detailed in FIG. 2. Two MIPS R12000 central processing units (CPUs) 201 and 202 are configured to process instructions and data in parallel. Primary cache facilities are provided within each of the processors 201 and 202 in the form of a separate instruction and data cache. Both processors 201 and 202 are equipped with a one megabyte secondary cache 203 and 204. The CPUs 201 and 202 are connected via a memory controller to a switch 206 and a main memory 207. The main memory 207 comprises two gigabytes of dynamic RAM.

The switch 206 enables up to seven different non-blocking connections to be made between connected circuits. A graphics card 208 receives instructions from a CPU 201 or 202 in order to render image data and graphical user interface components on the monitor 104. A high bandwidth SCSI bridge 209 facilitates high bandwidth communications to be made with the digital tape player 101 and the frame store 102. An I/O bridge 210 provides input output interface circuitry for peripherals, including the graphics tablet 105, the keyboard 106 and a network. A second SCSI bridge 211 provides interface connections with an internal hard disk drive 212. This has a capacity of thirteen gigabytes. The second SCSI bridge 211 also provides connections to a CDROM drive 213, from which instructions for the central processing units 201 and 202 may be installed onto the hard disk 212.

Figure 3:
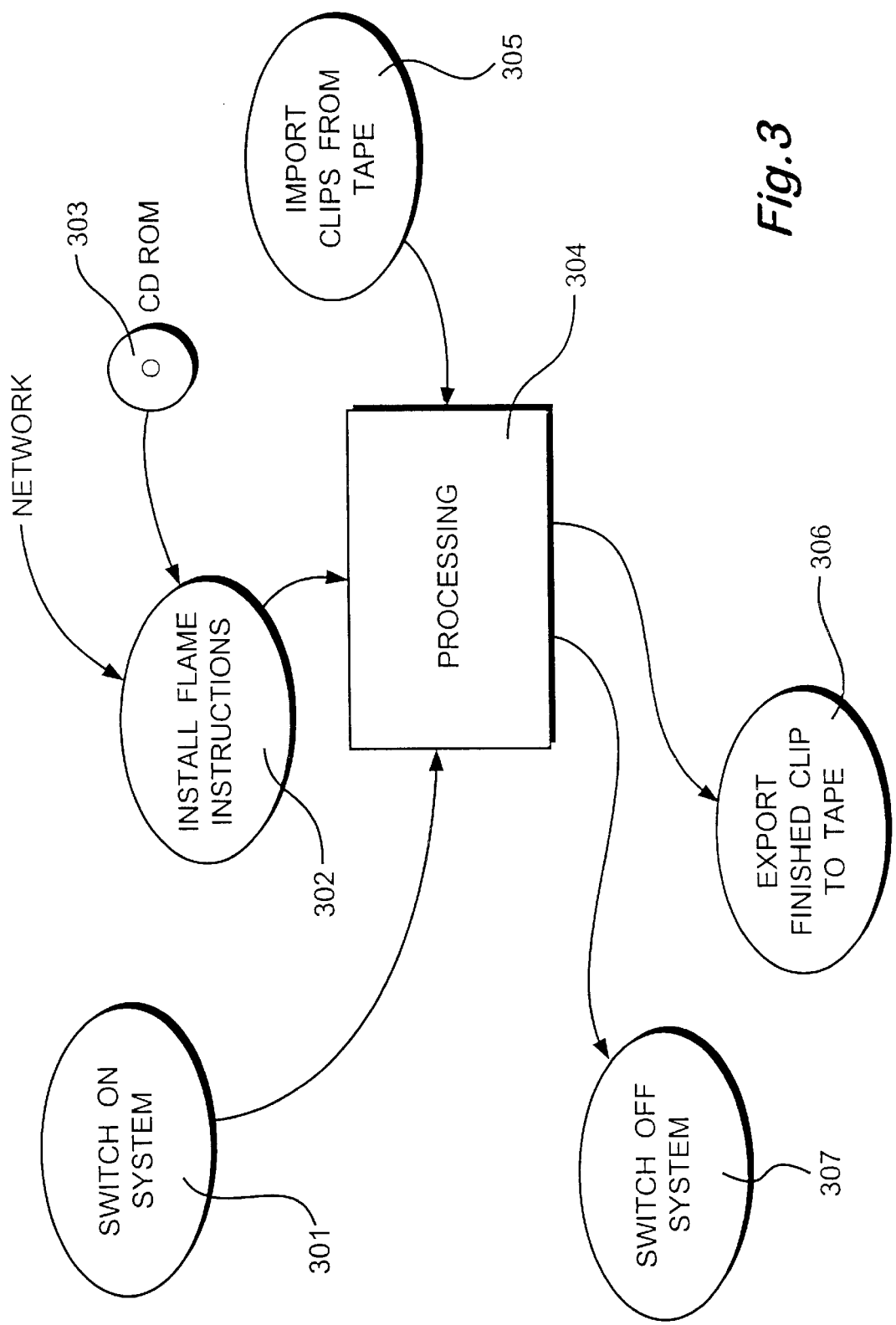
FIG. 3 details user operations performed on the image processing system shown in FIG. 1, including processing images.

Steps performed by the user when operating the image processing system shown in FIG. 1 are detailed in FIG. 3. At step 301 the user switches on the computer 103 and logs on to their user account. If necessary, the user proceeds to step 302 in order to install Flame instructions onto the computer's hard disk 212. Instructions may be provided on a CDROM 303 via the CDROM drive 213, or over a network. Thereafter, control is directed to step 304, whereafter the instructions are executed by the CPUs 201 and 202.

If starting on a new job, it will be necessary to obtain image data from film or video clips stored on digital tapes. This is done at step 305, where input clips are transferred from the tape player 101 to the digital frame store 102. Once a finished clip has been generated from the input clips, this is exported to tape at step 306. Alternative forms of import and export of image data may be performed as necessary, including transfer of image data over a network, transfer of image data from CDROM or transfer of data directly from a camera that may be connected to the input of a suitably equipped graphics card 208. Once finished using the image processing system, at step 307 the user logs off from their account and the computer and other equipment are switched off if necessary.

Figure 4:
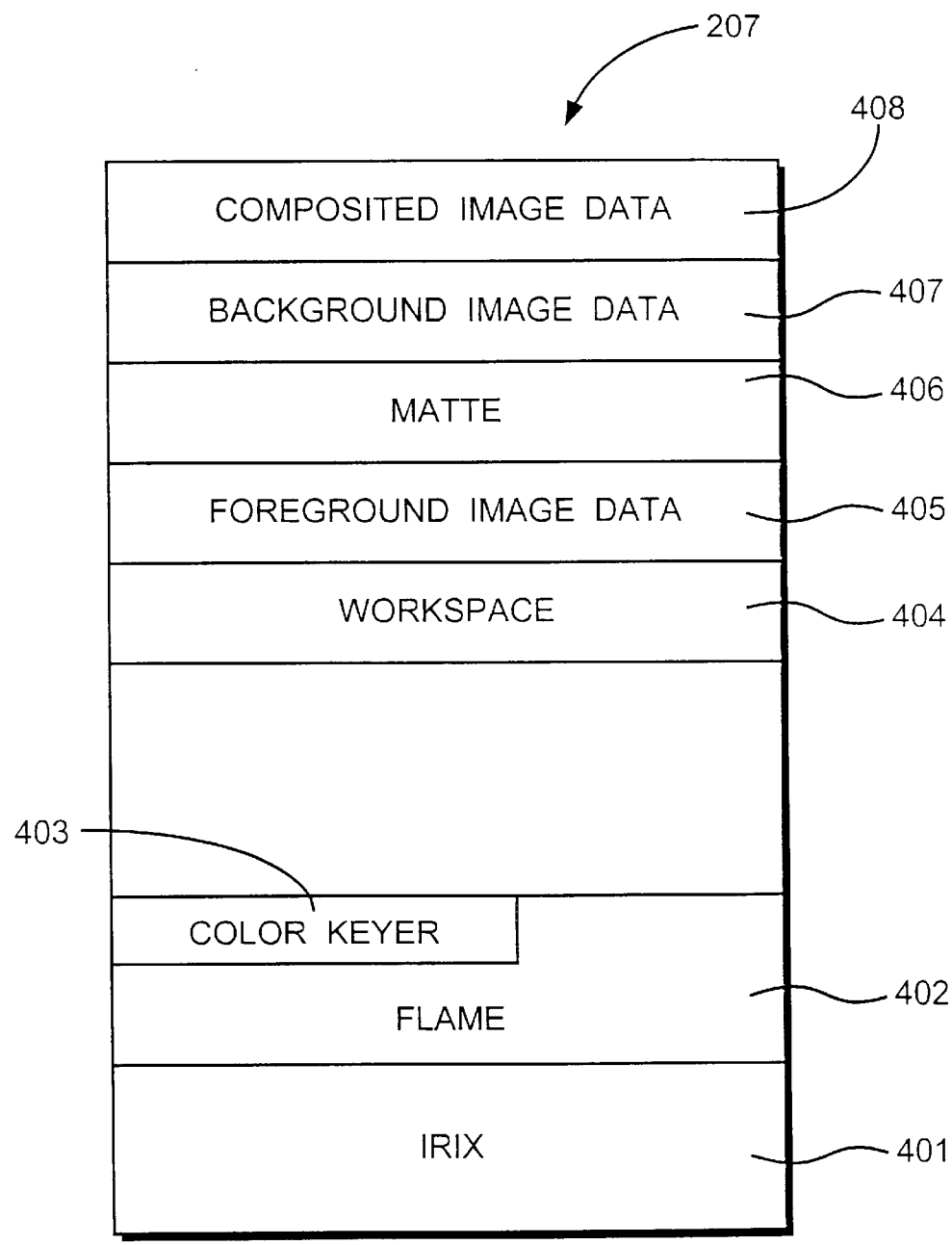
FIG. 4 details the contents of the main memory shown in FIG. 2 as they would appear during the image processing shown in FIG. 3.

The contents of the main memory 207 shown in FIG. 2, during image processing 304, are detailed in FIG. 4. An operating system 401 provides common instructions required for applications running on the computer 103. A suitable operating system is the Irix (TM) operating system available from Silicon Graphics.

In the present embodiment, the main memory includes Flame instructions 402 for image processing. The present applicant has image processing applications that include Flame (TM), and the word Flame will henceforward refer to an improved version of Flame, operating in accordance with the present invention. Flame instructions 402 include color keyer instructions 403. The instructions 402 and 403 may originate from a CDROM 303 or from a network connection, including an Internet connection.

Main memory 207 further comprises a workspace 404, used for temporary storage of variables and other data during execution of instructions 401, 402 and 403 by the processors 201 and 202. The main memory also includes areas for foreground image data 405, a matte 406, background image data 407 and composite image data 408.

Figure 5:
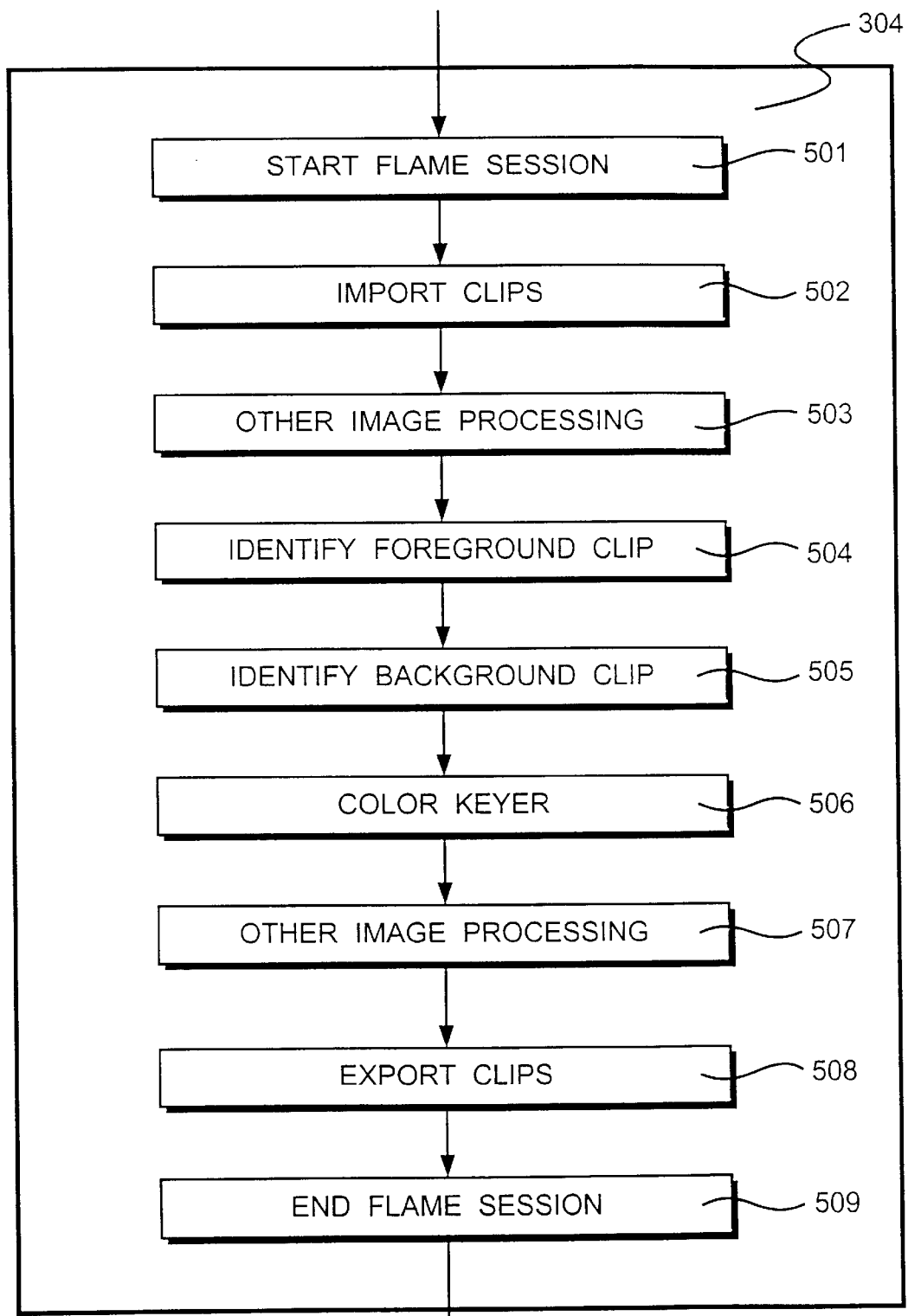
FIG. 5 details processes performed during image processing shown in FIG. 3, including a color keyer.

Image processing 304 shown in FIG. 3, facilitated by instructions 402 and 403, is detailed in FIG. 5. At step 501 the Flame session is started. This comprises the execution of an executable file on the hard disk 212 from which instructions for the Flame application 402 will be loaded. At step 502 the user initiates operations to import clips of image data. A clip comprises sequential image frames that may originate from a variety of sources, such as video or film. Each frame may comprise several megabytes of image data, depending upon the source and data format. The import operation results in a transfer of image data from a source medium, such as a digital tape on digital tape player 101, to the frame store 102.

At step 503, image processing is performed. Many operations may be performed at step 503, including effects such as color warping, image distortion, motion blur, and so on. The operations of step 503 may be considered as those required prior to a process of color keying.

Color keying is a process in which a foreground image is combined with a background image, a process known as compositing. Although individual image frames may be composited in this way, typically the same process is applied over multiple image frames, with the effect that a sequence of foreground images is superimposed upon a sequence of background images. At step 504 the foreground clip is identified, and at step 505 the background clip is identified. At step 506 the color keyer instructions 403 are executed by processors 201 and 202. In the color keying process, image data from the foreground clip is analysed to identify pixels of a particular color, which may be replaced by pixels from the background clip.

Usually the foreground scene is shot against a blue background in order to facilitate color keying. Variations in color of the blue background and the color of foreground talent make the automatic removal of the blue background a non-trivial process. Once identified, blue pixels can be replaced by background pixels. In most color keyer systems, a key or matte is generated from the foreground image. Each pixel in the matte has a value that determines the level of foreground versus background. Matte data is then used to control a keyer, in which foreground and background pixel data are mixed in appropriate proportions.

Color keying also has other applications. In selective keying, the color keyer is used to identify a particular color in an image. Image areas having this color may then be extracted using the matte, and processing, for example color warping, may be applied to these image areas, which are then put back into the original image.

The output from the color keying process 506 is a composite clip comprising image data from both foreground and background clips. At step 507 other image processing is performed, including effects that may now be applied to the results of the color keying process 506, as well as to other clips. At step 508, the finalised output clips are exported, for example back to tape, using the digital tape player 101. At step 509, the Flame session is ended.

Figure 6:
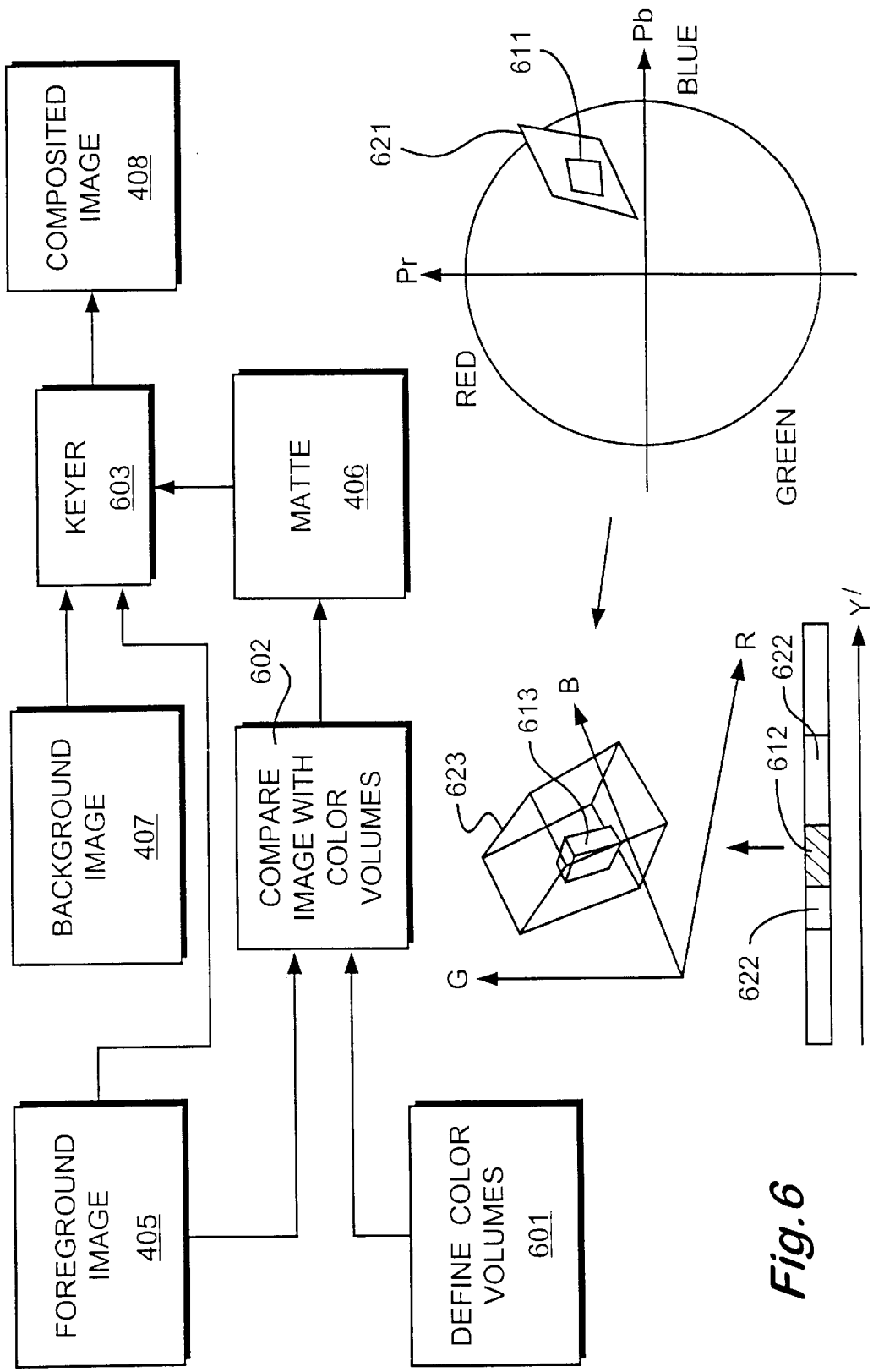
FIG. 6 details the color keyer process shown in FIG. 5, and summarises the present invention, including processes for defining color volumes, comparing a foreground image with color volumes and a keyer.

The color keying process 506 shown in FIG. 5 is summarised in FIG. 6. Foreground image data 405 comprises an image frame from the foreground clip selected at step 504. A process of defining color volumes 601 is performed in which color volumes are defined in color space. Once color volumes are defined, process 602 compares the color of foreground image pixels with the color volumes defined at step 601. The result of this comparison is a matte 406. The matte 406 comprises pixels whose values are derived from the comparison performed at step 602. A keyer process 603 performs mixing between foreground and background for each individual pixel, resulting in a composite image 408. The mixing level is determined by pixel values in the matte 406.

The color of any pixel in the foreground image 405 is defined by co-ordinates in a color space having dimensions of red, green and blue. Image data 405, 407 and 408 comprises pixels with data represented by co-ordinates in red, green, blue (RGB) color space. The color and luminance of each pixel is defined by pixel data comprising three values: one each for red, green and blue. In RGB color space, luminance and color information is mixed in each of the three dimensions. It is not possible to identify a dimension of pure color or luminance from any one of these co-ordinates.

In a color keyer, foreground and background images are combined by identifying pixels in the foreground image having a particular color, such as a particular shade of blue. An effective keyer must distinguish these background pixels from the foreground pixels. The key color will vary somewhat, as it is impossible to physically create a blue screen of precise and uniform color over any substantial area. At the very least, the presence of shadows and dirt will vary the color or brightness at various different points on the blue screen. In order to counteract this, the key color is defined in color space not as a single point, but as a color volume. Any pixel falling inside this volume may be considered as belonging in the background.

This color volume is called the tolerance volume. In the invention, the tolerance volume is defined mainly by a tolerance diamond 611 in a co-ordinate system of pure color. This diamond is extended into a dimension of pure luminance by a tolerance luminance range 612, resulting in the definition of a tolerance volume 613.

The dimensions of pure color and a separate dimension of luminance are provided by the Y'PbPr color space. The invention facilitates definition of a color volume 613 by simple manipulations of the diamond shape 611. Variations in luminance for pixels in the color volume are taken into account by the definition of the luminance range 612, thereby extending the diamond 611 into a volume, which may be viewed as the projection in RGB color space 613. The location, orientation, size or shape of the diamond 611 is not constrained.

Although image data is expressed as RGB values, comparisons are performed at process 602, in which a determination is made as to whether a particular pixel lies inside or outside the tolerance volume 613. If a pixel's color is inside the tolerance volume 613, then the resulting matte pixel is set to a value of zero.

It is possible that a process can be performed in which pixels having a color outside the tolerance volume 613 are always set to a value of one. However, this results in a rough look to the border between foreground and background images. Preferably, a softness diamond 621 and range 622 are defined, resulting in a softness volume 623 that encloses the tolerance volume 613. In the comparison process 602, pixels whose color is outside the softness volume 623 result in a matte value of one. Pixels whose color is in the region between the tolerance and softness volumes are given intermediate values, depending upon their proximity to one or other of the volumes 613 and 623.

In the preferred embodiment, the range of matte values is expressed by integers in the range zero to two hundred and fifty-five, so as to facilitate high speed integer mathematical processing. For the purposes of simplifying the description, matte values will be considered as having a fractional range from zero to one, and those skilled in the art of digital processing will be able to make suitable scaling adjustments where necessary, in order to implement the invention.

A matte value of zero causes the keyer to select a pixel whose red, green and blue data are copied from the corresponding background image pixel. A matte value of one selects pixel data from the foreground image. Intermediate fractional values have the effect of interpolating for each of the red, green and blue values, of the corresponding foreground and background pixels. As a result, the edges between foreground and background in the resulting composite image 408 can be made to appear more natural.

Control of the diamond shapes 611 and 621, along with their corresponding luminance ranges 612 and 622, enable the user to quickly and intuitively define a color volume of precise color and luminance characteristics. However, because the volumes are defined in Y'PbPr color space, not only is the interface highly intuitive: it is also appropriate to the variations in key color that arise naturally in a typical environment. For example, a studio with a blue screen will have variations in luminance that are characteristic of shadows and lighting intensity variations. These directly correspond to the range of luminance 612 and 622. Variations in pure color of the blue screen have a different cause, such as paint inconsistency and dirt. These require characterisation by color, in the form of the diamonds 611 and 612. Because there is no restriction on the location of the diamonds, any variations of color occurring naturally in the studio environment can be taken into account.

Figure 7:
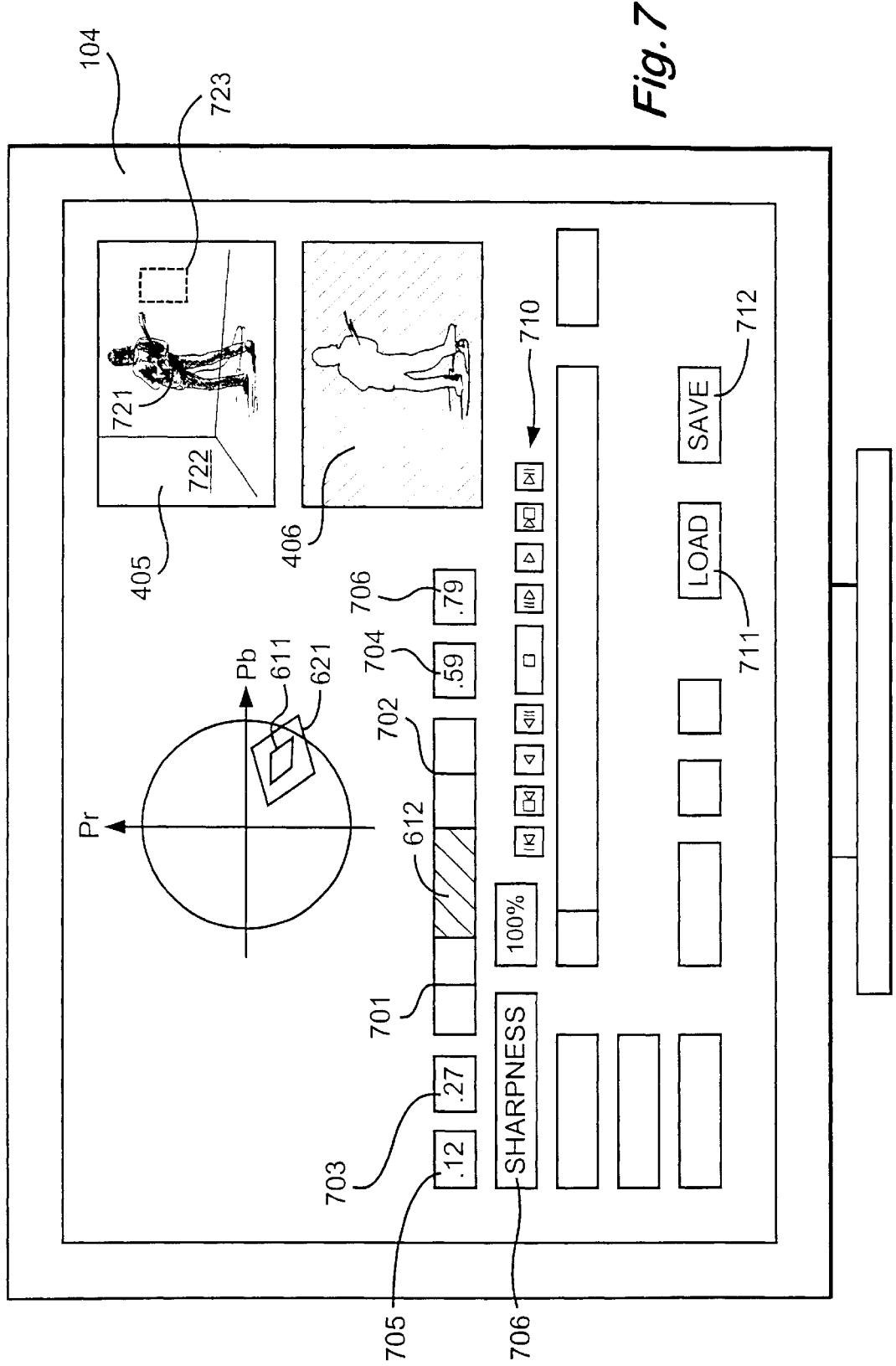
FIG. 7 details the user interface presented to the user on the monitor shown in FIG. 1, for controlling the color keying process summarised in FIG. 6, including a color diagram.

The computer 103 shown in FIG. 1 generates a user interface that is displayed on the monitor 104. The user interface presented to the user during the color keying process 506 is illustrated in FIG. 7. The foreground image 405 and the resulting matte 406 are both displayed. Other images may be displayed, in accordance with the user's wishes. To the left of the images 405 and 406 is a diagrammatic representation of the Y'PbPr color space, including the tolerance 611 and softness diamonds 621. Also shown is a luminance bar 700, including the tolerance range 612, and extension marks 701 and 702 that show the extent of the softness volume in the luminance dimension Y'. At either end of the luminance range 700 are numeric fields 703, 704, 705 and 706 that provide a numeric indication of minimum tolerance luminance 703, maximum tolerance luminance 704, minimum softness luminance 705 and maximum softness luminance 706. A sharpness control 706 controls a sharpness value.

Transport controls 710 facilitate selection of clip frames, start positions, playback, fast forward and rewind of image data. Using these controls, the user may define color volumes and then apply these to several or all frames of a clip. It is possible to define color volumes at selected frames in a clip, and then to interpolate between these color volumes so as to perform appropriate color keying at intermediate frames. This makes it possible to ensure that smooth variations in foreground scene characteristics are taken into account. A high quality color keying process can therefore be achieved throughout a clip, without the need to determine color volumes for each frame individually. When an interpolation of this kind is performed, the interpolation may be linear, or controlled by a user-defined animation curve, thereby taking into account non-linear changes in color characteristics, such as those that might occur when clouds suddenly obscure the sun. Load and save buttons 711 and 712 facilitate storage of color keyer settings for recall in a later Flame session.

Several other buttons are provided on the interface. In particular, interface controls are provided for color sampling. In the foreground image 405, talent 721 is shot against a blue screen background 722. The user identifies a region 723 of the blue screen background 722 characteristic of the range of color that must be contained within the tolerance volume. The user can select several such regions 723, in various parts of the image, thereby accumulating the totality of color that needs to be enclosed by the tolerance volume.

Figure 8:
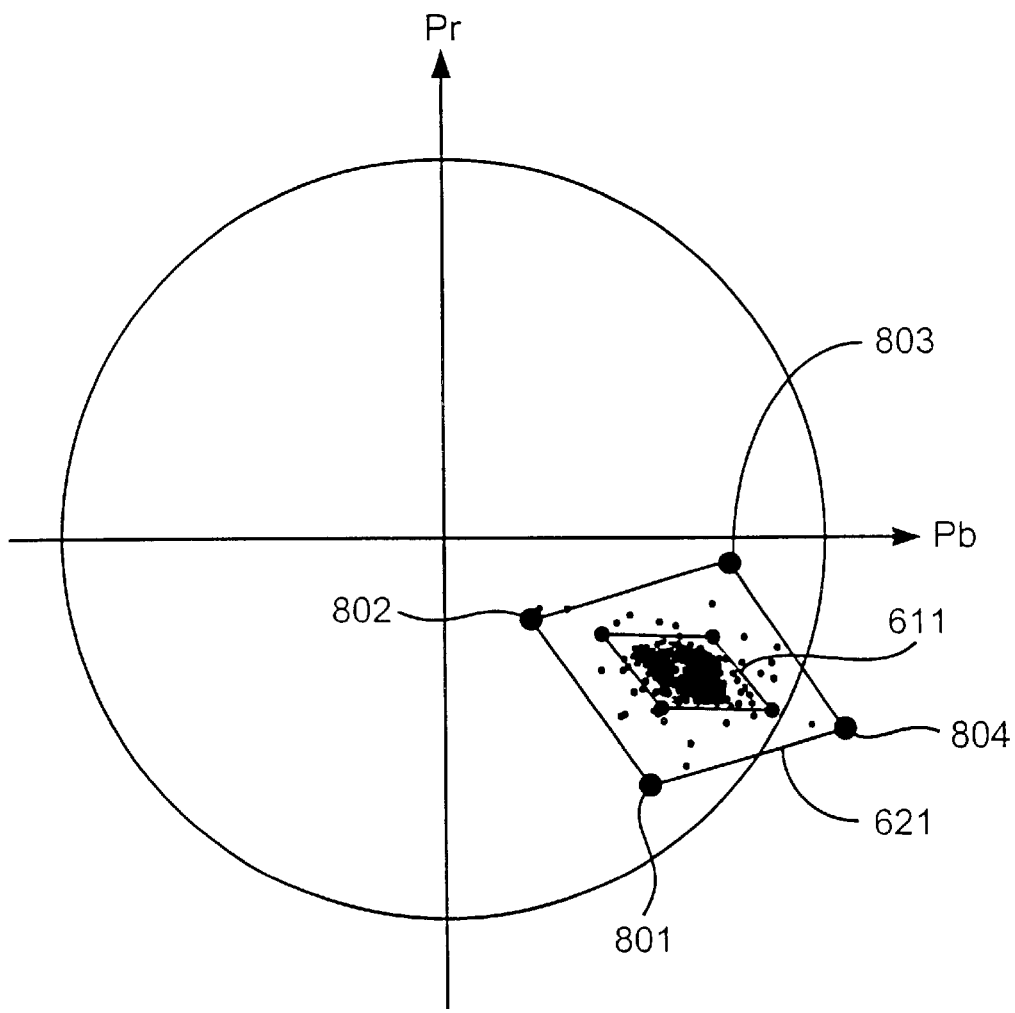
FIG. 8 details the color diagram shown in FIG. 7.

Pixel colors are accumulated by this sampling procedure, and can be superimposed upon the PbPr color diagram as detailed in FIG. 8. Pixel colors from sampled regions 723 are concentrated in a region that the user has enclosed by the tolerance diamond 611. A similar sampling technique may be performed to identify an appropriate area for the softness diamond 621.

The softness diamond is intended to control the edges between foreground and background. An appropriate definition of the softness volume 623 results in a softness to the edges in these border regions. Samples are taken from small areas of the foreground image 405 that are intermediate between foreground and background. A typical example of such a region is when the hair of an actor interferes with background pixel values. Samples of this type lead to the user defining the softness diamond 621. A combination of viewing pixel colors as shown in FIG. 8, and previewing the matte 406 and or the final composite image 408, enable the user to achieve consistent high quality results quickly. Pixel colors may also be superimposed upon a representation of luminance range 700. Alternatively, color space may be viewed in a three dimensional projection, such as RGB, in order for the user to gain a familiarity with the color content of an image that is being processed.

The tolerance diamond 611 and the softness diamond 621 include control points 801 to 804 that may be positioned anywhere in the PbPr color plane. In the preferred embodiment only three control points are used on each diamond, as the fact that the diamond has parallel sides always enables the fourth control point to be determined automatically, thus simplifying user-interaction with the object. Control points are omitted from the tolerance diamond for the sake of clarity. The diamond is characterised in that it has pairs of parallel sides. This facilitates processing that will be described subsequently. The user can stretch, rotate and or translate the tolerance or softness diamond by manipulation of their respective control points.

Figure 9:
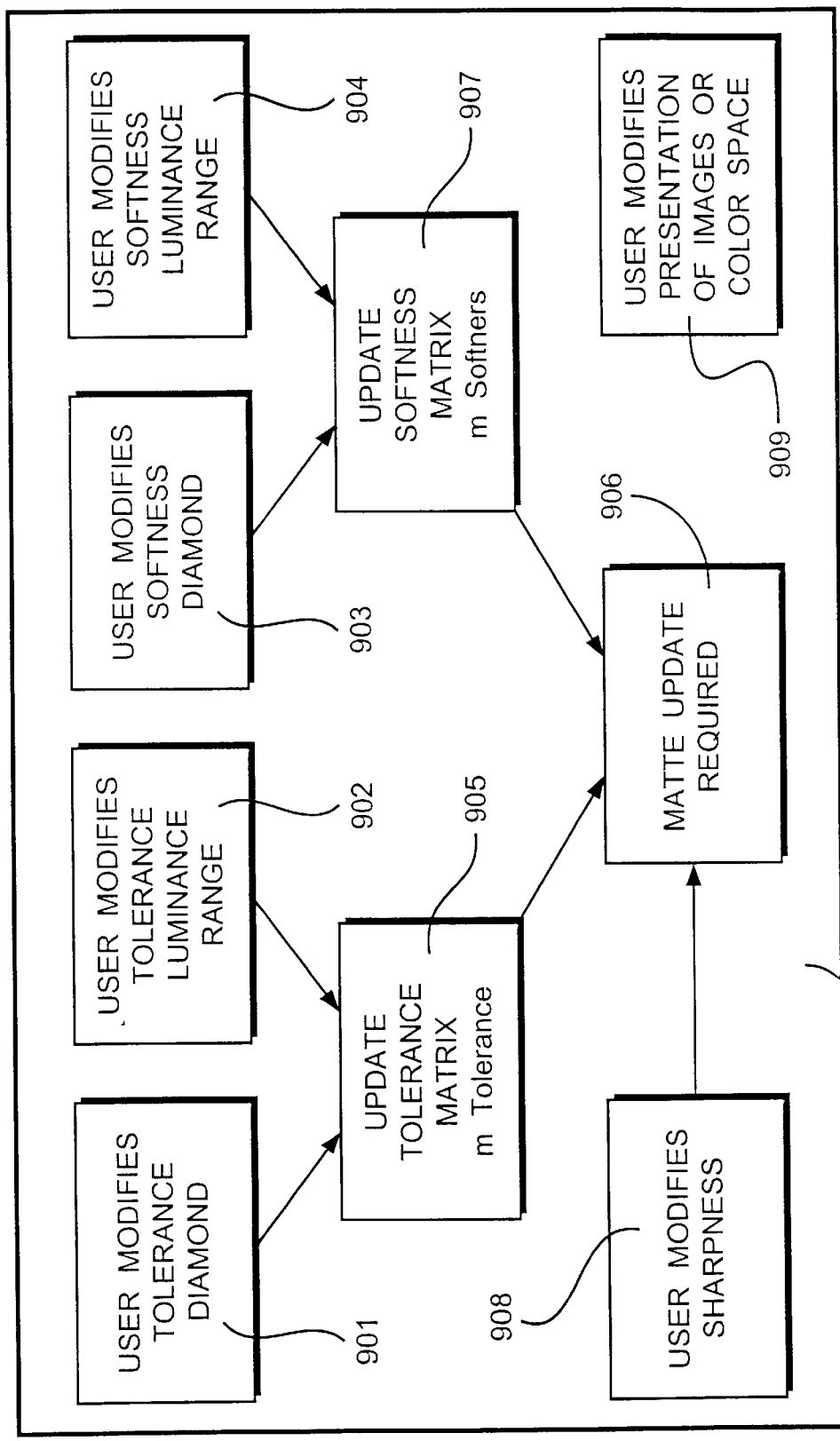
FIG. 9 details the process of defining color volumes shown in FIG. 6, including steps for updating color volume matrices.

The process 601 of defining color volumes 613 and 623, illustrated in FIG. 6, is detailed in FIG. 9. Steps 901 to 902 represent user-events in a multi-tasking graphical user interface environment illustrated in FIG. 7. At step 901 the user modifies the tolerance diamond 611. As soon as a change to the tolerance diamond has occurred, processing is directed to step 905, where a tolerance matrix, mTolerance, is updated. Similarly, if a change is made to the tolerance luminance range 612, at step 902, an update of the tolerance matrix is also required. After step 905, control is directed to step 906, where a requirement is asserted that a matte update is required. This will have the effect of initiating process 602.

If the user modifies the softness diamond 621 at step 903, or the softness luminance range 622 at step 904, control is then directed to step 907, where a softness matrix, mSoftness, is updated. Thereafter, control is directed to step 906, where a requirement for a matte update is asserted. The user may modify the sharpness 706 at step 908. Processing is subsequently directed to step 906. At step 909 the user modifies presentational aspects of the images or color space. No matte update is required in response to these types of operations.

Figure 10:
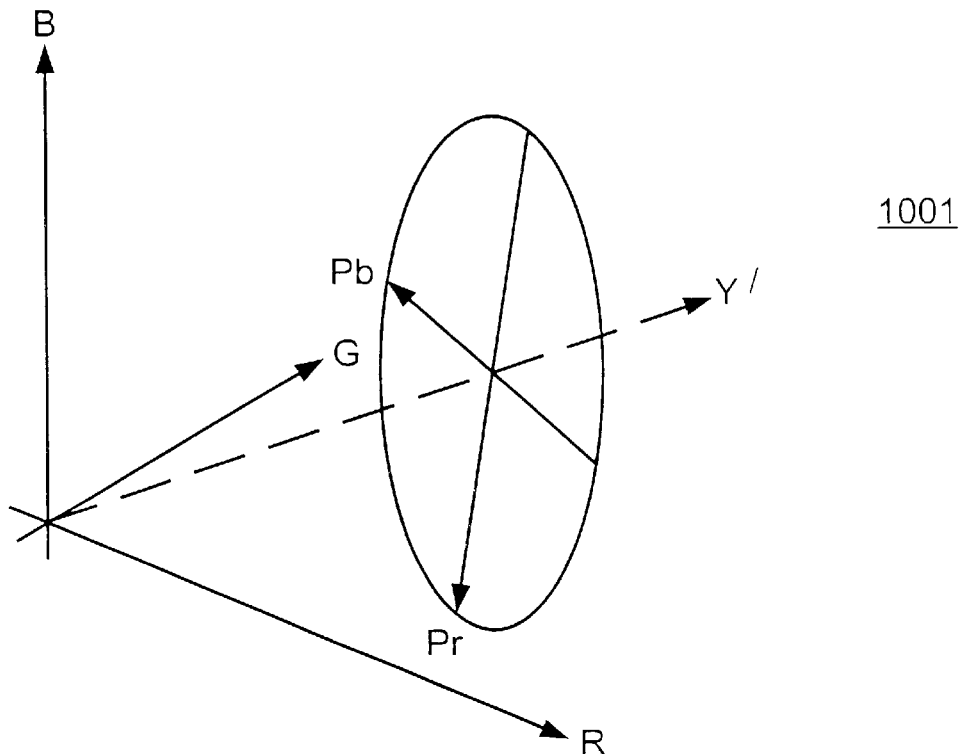
FIG. 10 details relationships between color spaces used by the present invention.

FIG. 10 details the relationship between RGB and Y'PbPr color spaces. Pixel data for images 405, 407 and 408 is stored in RGB form, with each pixel being defined by an intensity value for red, green and blue components. Color volumes 613 and 623 are defined by diamonds 611 and 621 and ranges 612 and 622 in Y'PbPr color space. In Y'PbPr color space, Y' is a dimension of pure luminance, that may be expressed as a range of fractional values from zero to one. Pb and Pr are color dimensions, with Pb being closely related to the blue of RGB, and Pr being closely related to green. Pb and Pr range across negative and positive values, and these may be considered as varying from minus one to plus one. However, these values are arbitrary and depend upon implementation.

Y'PbPr color space may be considered as having a cylindrical shape with a central-axis Y', that is a vector extending out from the origin of RGB color space, as shown at 1001. Conversion between these color spaces may be achieved by a matrix, and the parameters required for a transformation from RGB to Y'PbPr are detailed at 1002. Transformation from RGB to Y'PbPr may be assigned to a matrix A. The inverse of A, $A^{-1}$, provides transformation from Y'PbPr to RGB. There is an intuitive relationship between these color spaces for colors of pure black and pure white, as shown at the bottom of FIG. 10.

Figure 11:
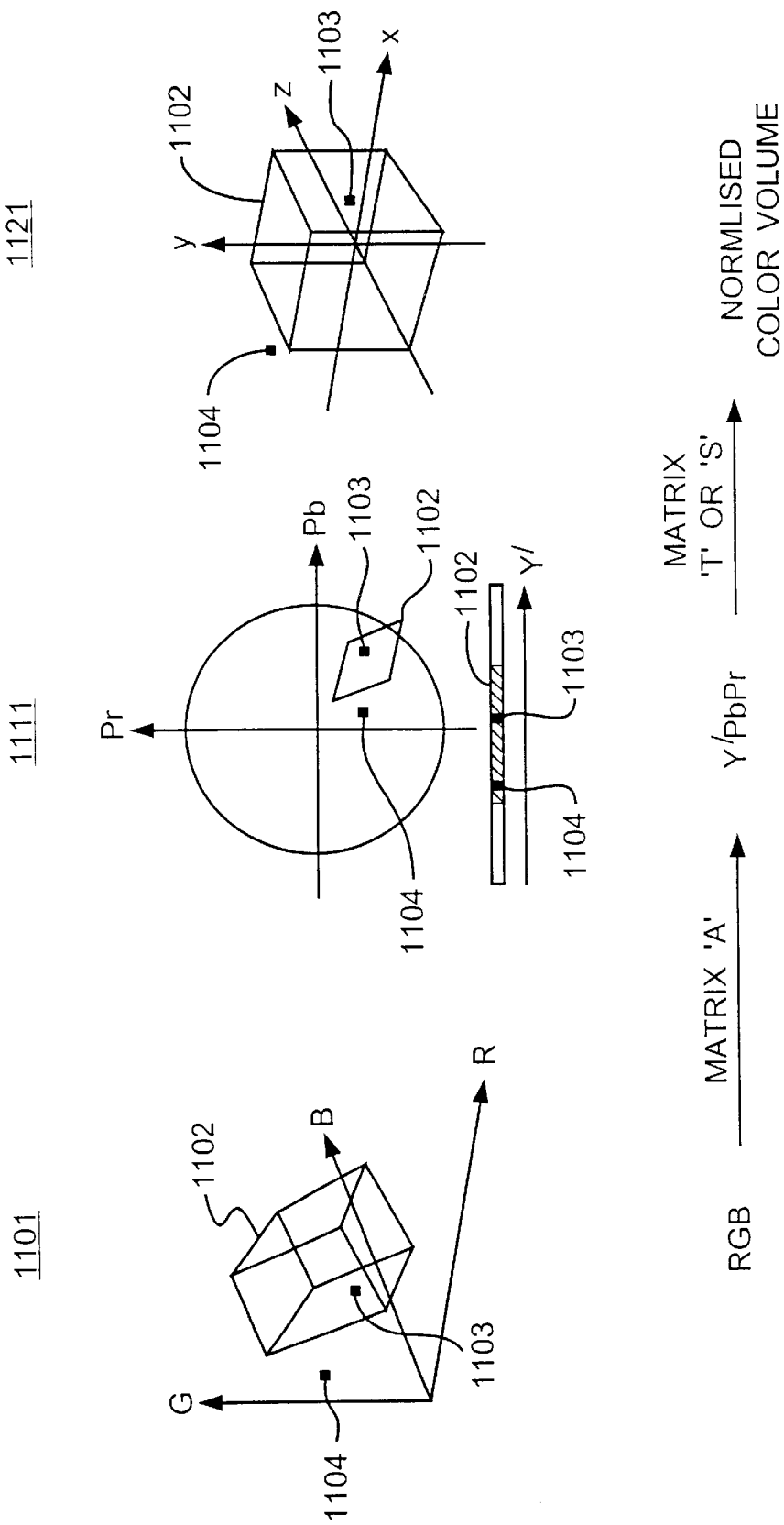
FIG. 11 details the steps of updating color volume matrices shown in FIG. 9.

The same type of updating operations are performed both for mTolerance at step 905 and for mSoftness at step 907, and FIG. 11 illustrates operations for both. The tolerance diamond 611 and luminance range 612 define a volume in Y'PbPr color space that may be viewed in RGB space as illustrated at 1101. Two pixels 1103 and 1104 are shown. Pixel 1103 is inside the color volume 1102, and pixel 1104 is outside. What is required is a translation which, when applied to these pixels, will make it easy to determine whether or not they lie inside the color volume 1102. Translation from RGB color space to Y'PbPr color space is achieved by the vector product of RGB co-ordinates with matrix A, defined at 1002 in FIG. 10.

If matrix A is applied to pixels 1103 and 1104, the result is as shown at 1111. Here it is more easy to discern by eye that pixel 1103 is inside the color volume, and pixel 1104 is outside. However, from a mathematical point of view, the calculations to determine this can be simplified by a further stage.

The color space diamonds may be considered as squares that have been sheered, rotated and translated. In combination with the luminance dimension, Y', the color volume 1102 may be considered as a cube that has undergone refined transformations of skew, rotation and translation. These translations may be identified from the PbPr co-ordinates of control points 801, 802, 803, 804, and the start and end values of the luminance range for the color volume. This derivation is simplified by the fact that rotation and skew are not applied in the Y' dimension. In the case of the tolerance volume, a matrix T is generated from control points on the tolerance diamond 611 and its luminance range 612. The result of application of matrix T to the Y'PbPr color space shown at 1111 is the cube shown at 1121.

At 1121 the color volume 1102 is a cube in a normalised color space, in which the dimensions are denoted x, y and z. The centre of the color volume 1102 is at (0,0,0). The eight points of the cube are at (−1,−1,−1), (−1,−1,1), (−1,1,1), (−1,1,−1), (1,1,−1), (1,−1,1), (1,1,−1) and (1,1,1). In this co-ordinate system, the co-ordinates of pixels 1103 and 1104 may be examined. If any of their three co-ordinates has a magnitude greater than one, then the pixel is outside the color volume.

Movement between RGB, Y'PbPr and normalised color spaces is characterised by two matrices. For the tolerance color volume, these are: A and T. For the softness color volume these are A and S. It is possible to concatenate the two matrices, so that a single matrix transformation may be applied to any RGB pixel. This has the effect of translating the pixel's color to the normalised color space for the respective color volume. In summary, mTolerance and mSoftness are given by:

mTolerance=A.T mSoftness=A.S

For example, to determine if a pixel (r,g,b) is inside the tolerance volume, (r,g,b) is multiplied by mTolerance to get (x,y,z). These three resulting values are examined. If any of their magnitudes is greater than one, then it is known that the pixel is outside the tolerance volume. A similar test can be applied to the same (rgb) values, this time using mSoftness, to determine whether the pixel is inside the softness volume.

Figure 12:
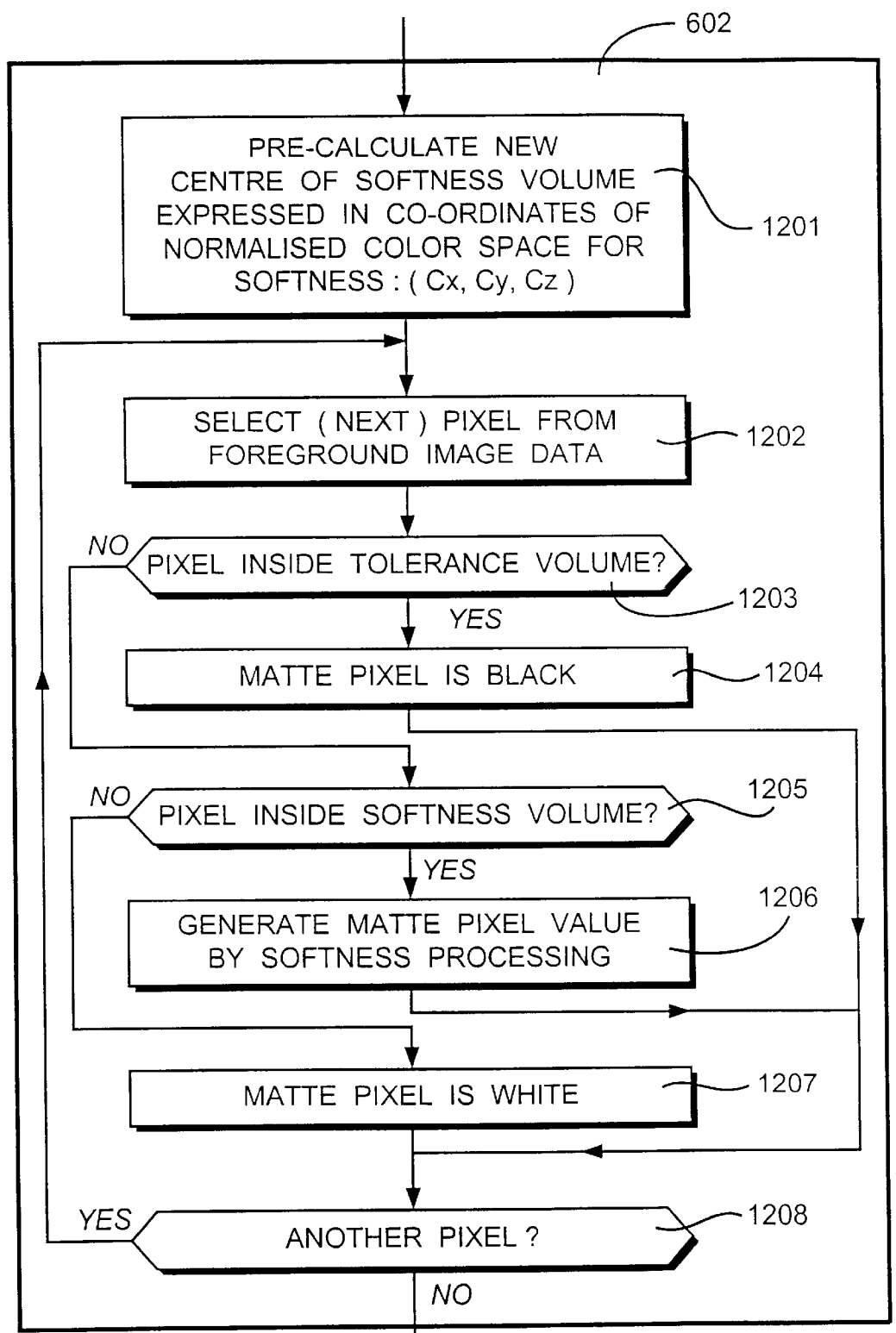
FIG. 12 details the process of comparing foreground image data with color volumes, shown in FIG. 6, including steps of pre-calculating a centre, questioning whether a pixel is inside a tolerance volume, questioning whether a pixel is inside a softness volume and finally a step of softness processing.

The process 602 of comparing the foreground image with color volumes, shown in FIG. 6, is detailed in FIG. 12. At step 1201 a pre-calculation is made of co-ordinates of the centre of the tolerance volume in terms of the x, y and z co-ordinates of normal color space for the softness volume. This preparatory step is required for subsequent calculations when a pixel is located between the tolerance and softness volumes.

At step 1202 the first or next pixel is selected from the foreground image 405. At step 1202 a question is asked as to whether the pixel is inside the tolerance volume 613. If so, control is directed to step 1204, where the matte pixel is given a value of zero. This is typically considered as giving a matte pixel the color black. Thereafter control is directed to step 1208. If the pixel is not inside the tolerance volume, control is directed to step 1205.

At step 1205 a question is asked as to whether the pixel is inside the softness volume 623. If not, control is directed to step 1207, where the matte pixel is given the value one. This is considered as a white matte pixel. If the pixel is inside the softness volume, control is directed to step 1206. At step 1206 it is known that the pixel's color must lie between the tolerance and softness volumes. The matte value required is in the range zero to one, a gray value, and calculations are performed at step 1206 to determine the relative proximity of the borders of the tolerance and softness volumes, so as to determine an appropriate level of greyness for the matte. At step 1208 a question is asked as to whether another pixel requires processing. If so, control is directed to step 1202. Eventually, after all pixels in the foreground image have been processed in this way, the matte generation will be complete.

The step 1201 of pre-calculating a centre is detailed in FIG. 13. When a pixel P lies between the softness and tolerance volumes, as shown at 1301, it is necessary to calculate a matte value between zero and one. This is also known as a softness value. The first step to finding a softness value is to identify a vector which passes from the centre of the tolerance volume 613 through the pixel P. For the purpose of subsequent calculations, it is necessary to know the location of the centre of the tolerance volume in the normalised x, y, z co-ordinate system that results from the application of the mSoftness matrix to RGB values. These co-ordinates are called Cx, Cy and Cz.

The sequence of steps required to obtain values for Cx, Cy and Cz is summarised in FIG. 13 below the diagram at 1301. It is known that the centre of the tolerance volume in normalised tolerance space is (0,0,0). It is also known that a transformation from RGB to normalised tolerance space can be achieved by application of mTolerance. Therefore, obtaining RGB co-ordinates of the centre of the tolerance volume 613 requires the application of the inverse matrix of mTolerance, $mTolerance^{-1}$. Then, in order to obtain the centre co-ordinates in the normalised softness color space, the mSoftness matrix can be applied. These transformations can be applied in the single step as shown at the bottom of FIG. 13, to obtain the centre co-ordinates (Cx,Cy,Cz) of the tolerance volume, in the normalised softness color space.

Figure 14:
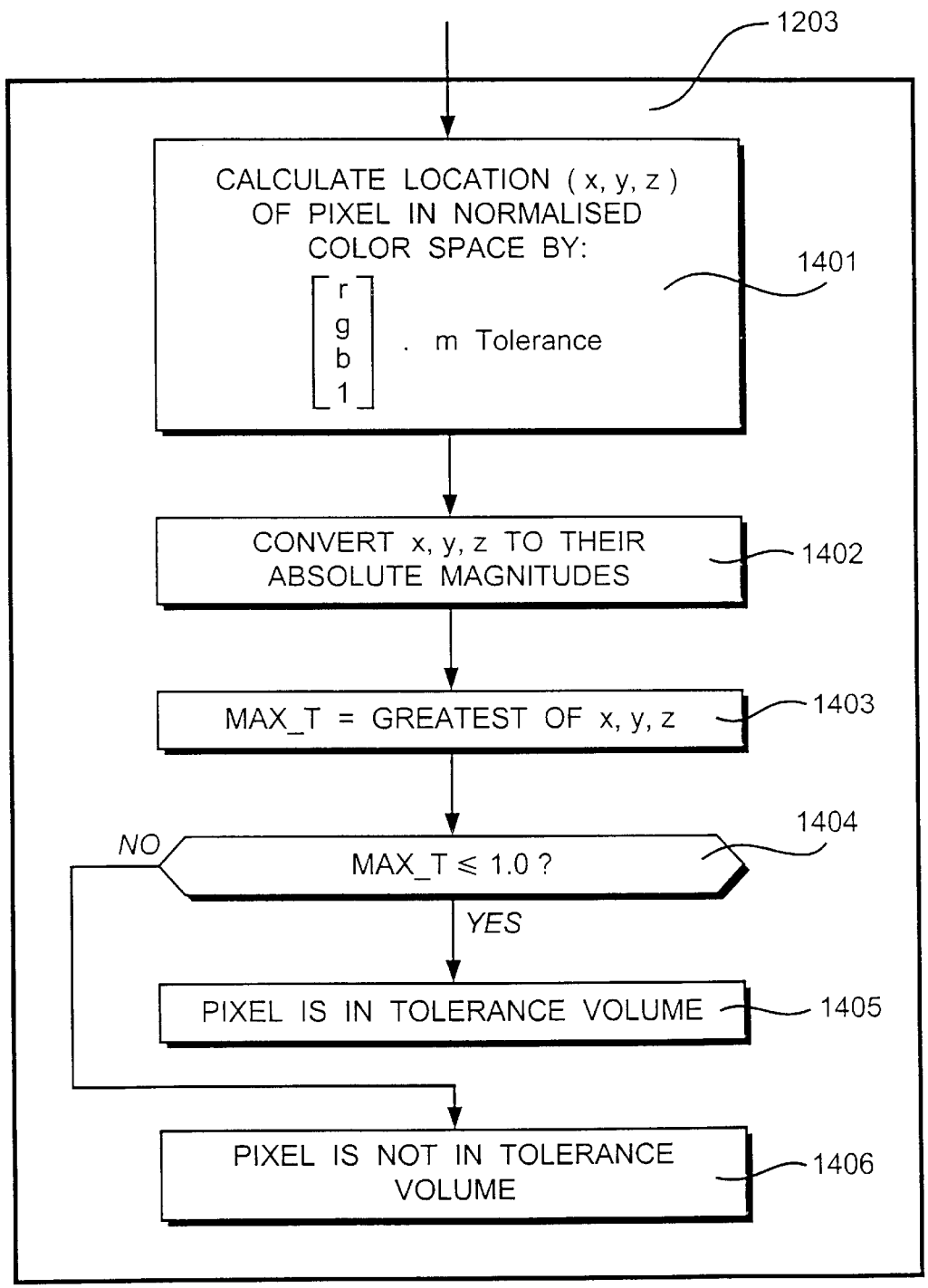
FIG. 14 details the step of questioning whether a pixel is inside a tolerance volume, shown in FIG. 12.

The question 1203 as to whether a pixel is located in the tolerance volume 613, shown in FIG. 12, is detailed in FIG. 14. At step 1401 the x, y and z co-ordinates of the pixel in normalised tolerance color space are obtained by application of the mTolerance matrix to the red, green and blue values of the pixel. At step 1402 the resulting x, y and z co-ordinates are converted to their absolute magnitudes. In this step, any negative values are made positive. At step 1403 a variable MAX_T is assigned to the greatest of the magnitudes of x, y or z.

The comparison performed at 1403 identifies a dimension in which subsequent softness calculations, if required, will also be performed. By considering only the dimension in which the pixel has the greatest distance from the centre of the tolerance volume 613, it becomes unnecessary to combine dimensions and perform three-dimensional geometric calculations when calculating softness. This greatly improves processing speed.

At step 1404 a question is asked as to whether MAX_T is less than or equal to one. If so, control is directed to step 1405, where it is asserted that the pixel is inside the tolerance volume 613. Alternatively control is directed to step 1406, where it is asserted that the pixel is not inside the tolerance volume 613.

Figure 15:
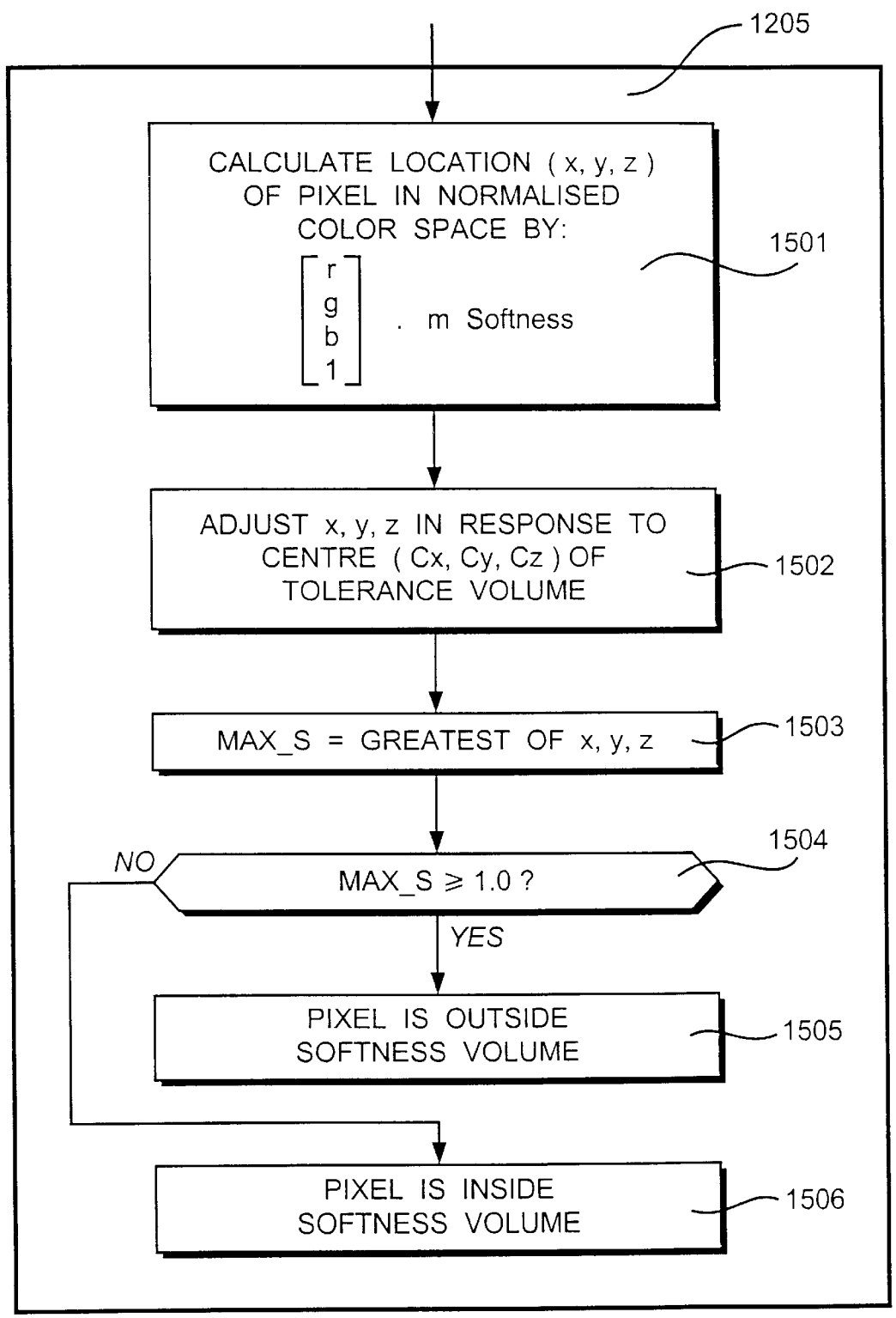
FIG. 15 details the step of questioning whether a pixel is inside a softness volume, shown in FIG. 12, including a step of adjusting values.

The question 1205 as to whether a pixel's color lies within the softness volume, asked in FIG. 12, is detailed in FIG. 15. At step 1501 the x, y and z co-ordinates of the pixel in normalised softness color space are obtained by application of the mSoftness matrix to the red, green and blue values of the pixel. At step 1502 these x, y and z values are adjusted in response to a new centre of the softness volume, defined as the centre of the tolerance volume. Step 1502 has the effect of generating positive values only for x, y and z. At step 1503 a variable MAX_S is set to the greatest of the magnitudes of x, y and z. At step 1504 a question is asked as to whether MAX_S is greater than or equal to one. If so, control is directed to step 1505, where it is asserted that the pixel's color is outside the softness volume 623. Alternatively, control is directed to step 1506, where it is asserted that the pixel's color is inside the softness volume.

Figure 16:
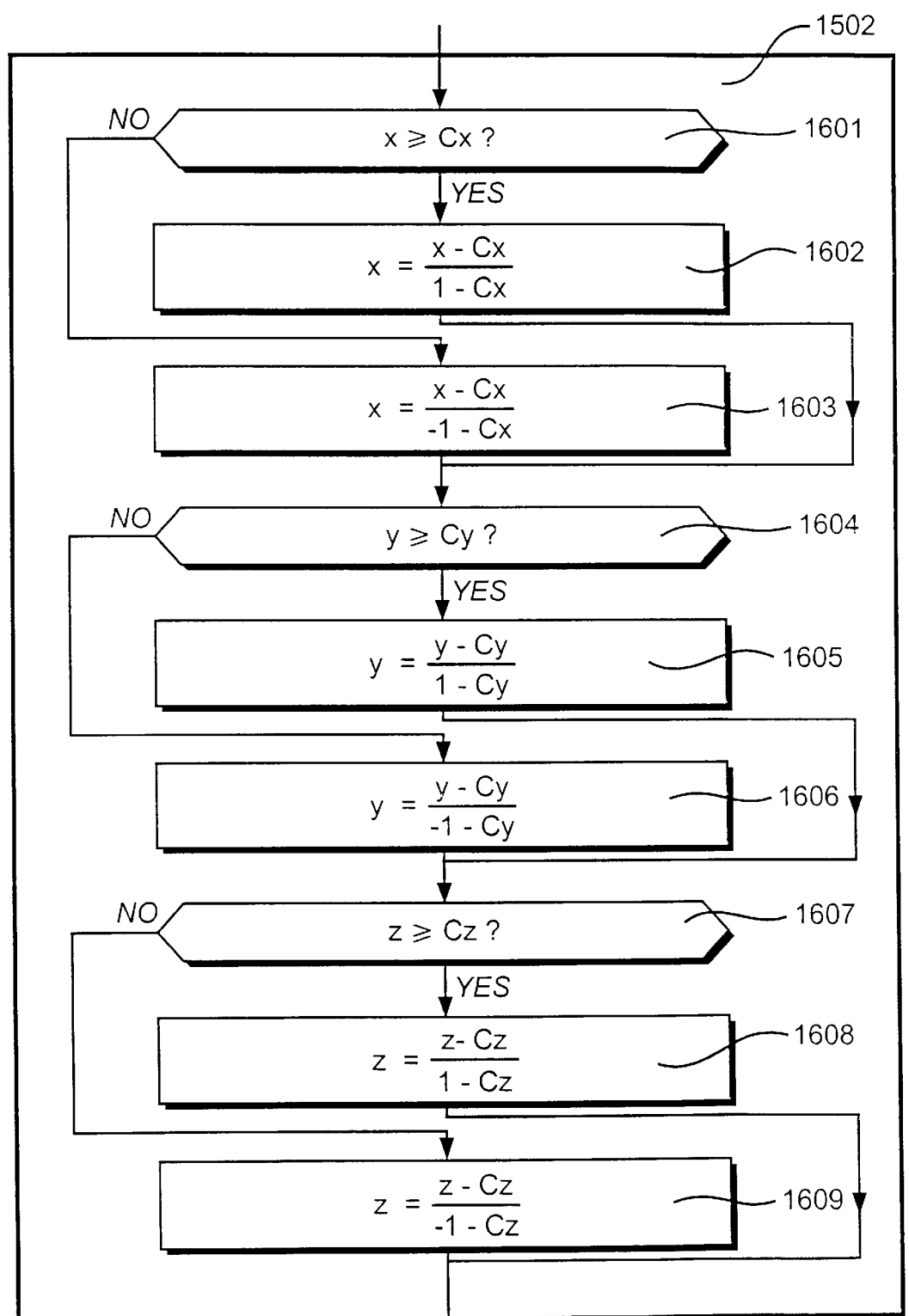
FIG. 16 details the step of adjusting values shown in FIG. 15.

The step 1502 of adjusting x, y and z, shown in FIG. 15, is detailed in FIG. 16. At step 1601 a question is asked as to whether x is greater than or equal to Cx. If so, control is directed to step 1602. Alternatively control is directed to step 1603. The precise behaviour of the adjusting equations shown at 1602 and 1603 is best understood with reference to FIG. 17. However, a basic characteristic may be observed that, if x has a value of one, then it is always greater than Cx, and the equation at step 1602 will ensure that the resulting value of x is still one. If x has a value of minus one, then this will always make it less than Cx, and the equation at step 1603 will result in x being given a value of plus one. The same set of criteria apply for y and z values, treated at steps 1604 through 1609. Thus, although intermediate, fractional values of x, y and z are modified, the outcome of the question as to whether they lie inside or outside the softness volume is unchanged. For the purpose of question 1504, it is only important that negative values have been converted to positive values. The scaling of fractional values for x, y and z is only significant if it becomes necessary to calculate a softness value for the matte at step 1206.

The effect of the re-centring equations shown in FIG. 16 is illustrated in FIG. 17. The softness and tolerance volumes 623 and 613 are shown in the x y plane of normalised softness space. The softness volume is represented by a square having sides two units in length, and a centre at (0,0,0). Within this co-ordinate system, the tolerance volume 613 is represented by a diamond, partly rotated. Its centre 1701 is at (Cx,Cy,Cz). A pixel P is shown at a point 1702 inside the softness volume 623 but outside the tolerance volume 613. It is necessary to calculate an appropriate level of softness for the pixel at point P. A line is drawn that passes from P through (Cx,Cy,Cz). This line is extended so it intersects the softness volume at 1703 and 1704. The same line also intersects the tolerance volume at 1705 and 1706.

What is required is to have a linear range of values along the line from the point 1706 to point 1704. This range of values is from zero to one. The position 1702 of point P along the line relative to these two extremes defines the softness value. The first stage is to determine the distance of point P along the line from the centre 1701 of the tolerance volume at (Cx,Cy,Cz) to the edge of the softness volume at 1704. This is the purpose of the re-centring calculations detailed in FIG. 16. Halfway points 1707 and 1708 are shown between the centre 1701 of the tolerance volume 613 and the intersections 1703 and 1704 with the softness volume 623.

As can be observed at the bottom of FIG. 17, halfway point 1707 is close in distance to points 1703 and 1701. The length of the line from 1701 to 1704 is greater than 1701 to 1703, and the halfway point 1708 is further away from the centre 1701 than halfway point 1707.

Figures 18, 19:
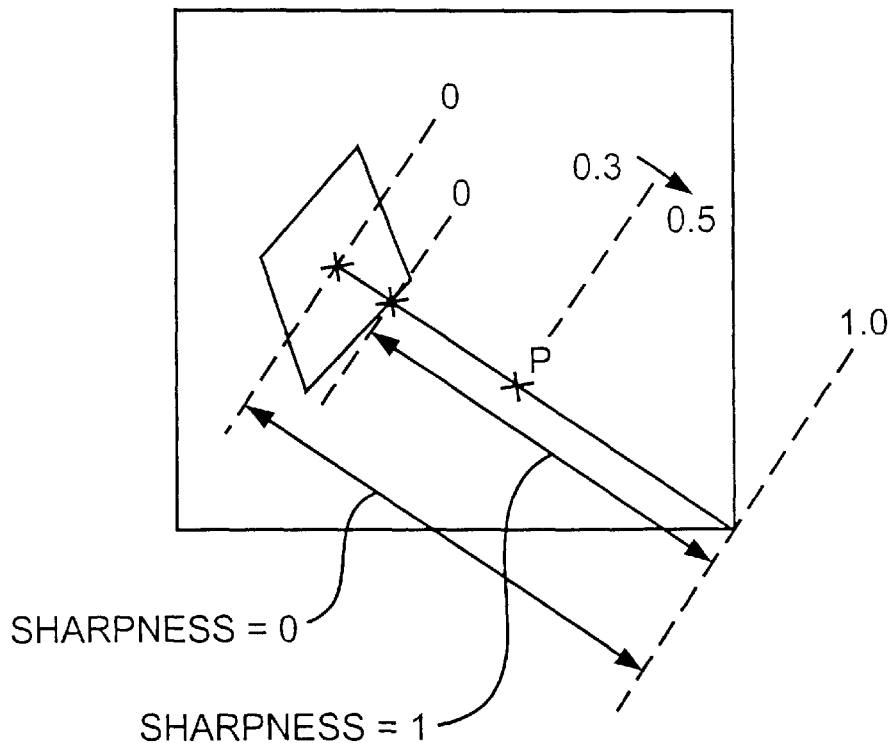
FIG. 18 details the step of softness processing, shown in FIG. 12.
FIG. 19 illustrates the effect of softness processing, detailed in FIG. 18.

Step 1206 for generating a matte pixel by softness processing, shown in FIG. 12, is detailed in FIG. 18. This final equation includes the sharpness value defined at step 908. With the sharpness value set to one, the result of the equation shown in FIG. 17 is to calculate a softness value for a point P, in direct response to its position along the line from the edge of the tolerance volume 613 to the edge of the softness volume 623. The edge of the tolerance volume corresponds to a matte value of zero, and the edge of the softness volume corresponds to a matte value of one. Intermediate positions of a point P along this line are given corresponding linearly proportional softness values between zero and one.

If the sharpness is set to zero, the zero point of the line starts at the centre of the tolerance volume 613. This is illustrated in FIG. 18. Point P is halfway between the centre of the tolerance volume and the edge of the softness volume. If the sharpness is zero, then the matte for the pixel at point P will have the value 0.5. If the sharpness is one, then the matte pixel will have the value 0.3. For sharpness values less than one, there is an abrupt change of value for pixels at the edge of the tolerance volume. The sharpness controls a level of non-linearity. Border regions between foreground and background images do not necessarily have linear characteristics. The assumption of linearity, when sharpness is set to one, may be incorrect for many image conditions. The variable level of sharpness enables the user to account for non-linearities in the border regions between foreground and background. An appropriate level of sharpness can be found by the user scanning through the range of values from zero to one, and stopping when the resulting composite image looks best. The sharpness can be animated along with the color volumes.

Figure 20:
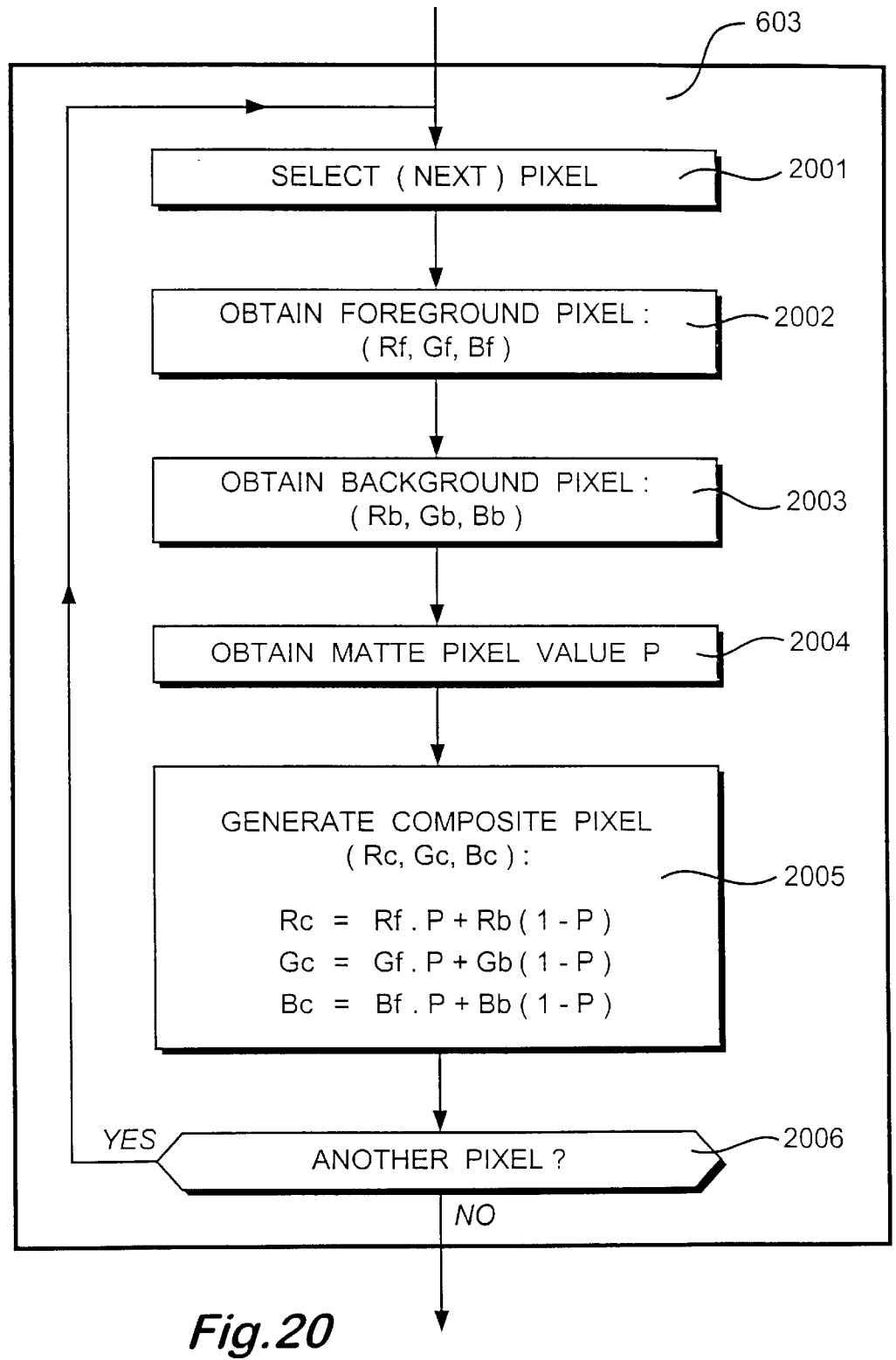
FIG. 20 details the process of keying, shown in FIG. 6.

Once a matte 406 has been generated, the keyer process 603, shown in FIG. 6, combines the foreground and background images to form the final composite image 408. The keyer process 603 is detailed in FIG. 20. At step 2001 the first or next pixel is selected. At step 2002 the corresponding pixel from the foreground image 405 is obtained. This has red, green and blue co-ordinates of (Rf,Gf,Bf). At step 2003 the corresponding pixel from the background image 407 is obtained, having color co-ordinates of (Rb,Gb,Bb). At step 2004, the matte pixel value P is obtained, having a range of zero to one. At step 2005 a process of linear interpolation is performed between the red, green and blue values from the foreground and background pixels. The level of foreground or background component is varied in response to the matte value P. If P is one, the foreground is selected. If the matte value is zero, the background is selected. Fractional values of P mix foreground and background proportionately.

Figure 21:
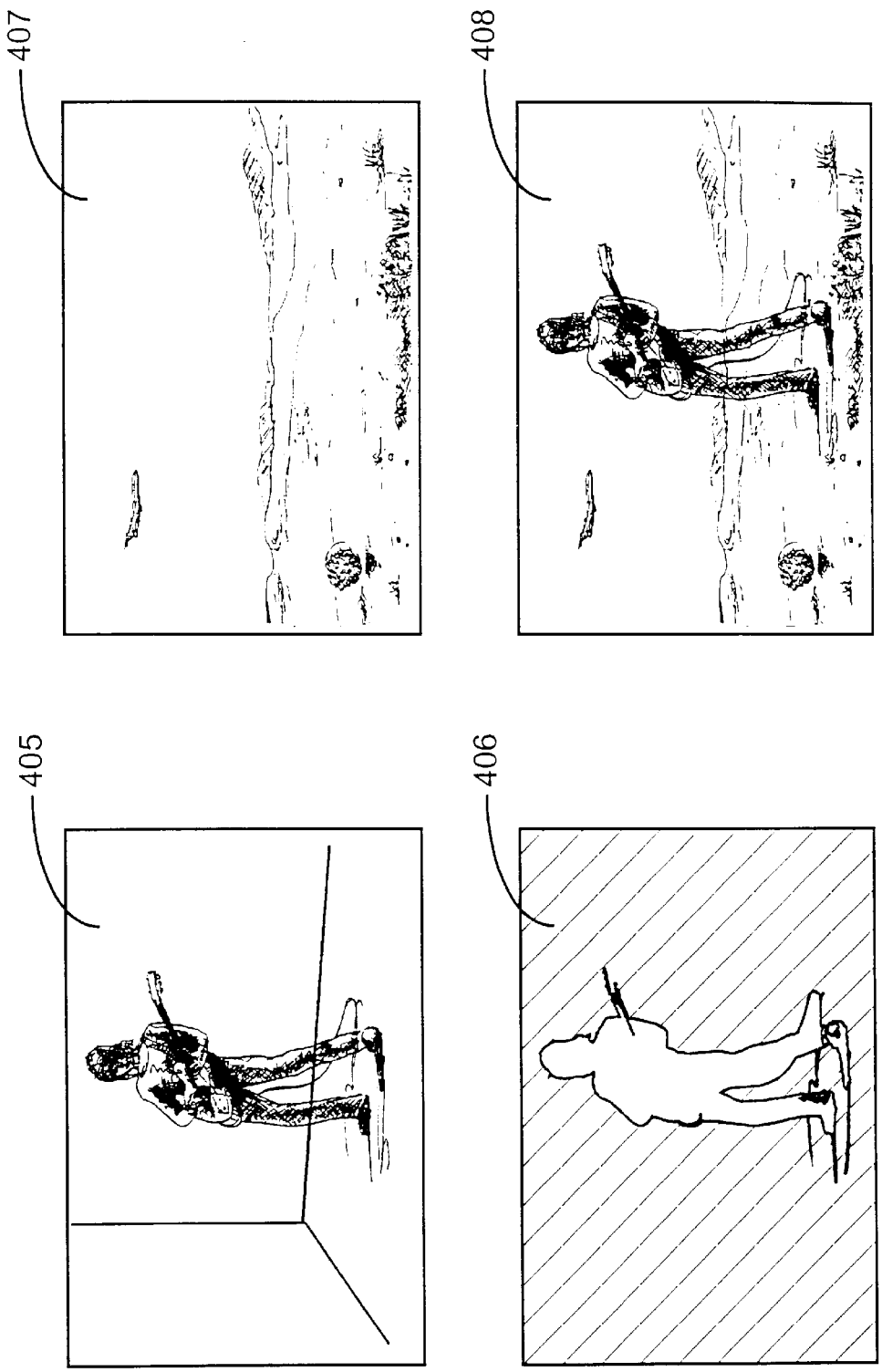
FIG. 21 illustrates the result of applying the keying process shown in FIG. 20.

The results of performing color keying 506 are illustrated in FIG. 21. The background image 405 includes talent against a blue screen background. The user samples the blue background to facilitate definition of a tolerance volume, and samples borders between the talent and the background, to facilitate definition of a softness volume. Pixels from the foreground image are then compared with the color volumes to produce matte pixel values. The background image 407 is then processed with the foreground image, in response to an interpolation controlled by the matte 406. The result is a composite image 408 of natural appearance and smooth border regions. The color space volumes are quickly defined due to the use of Y'PbPr color space, and because of the simple appearance and controllability of the diamonds.

Variations in characteristics of the foreground image throughout a clip may be taken into account by animation through interpolation of color volumes, and of the sharpness characteristic. The animations may include an animation control curve, to control the rate of change from one color volume definition to another, across multiple image frames in a clip.

What is claimed is:

1. Apparatus for processing image data, comprising storage means for storing instructions, memory means for storing said instructions during execution and image data including foreground image data, processing means for performing image processing in which said foreground image data may be analysed to generate matte values for controlling a keying process in which said foreground image is to be composited against background image data, and monitoring means for facilitating user interaction with said image processing, wherein said processing means is configured such that, in response to said instructions, said image data is processed by the steps of:
receiving a user indication of a background color, said indication defining a color diamond in a plane of constant luminance, and a luminance range;
defining a transformation in response to said user indication; and
processing pixels of said foreground image with said transformation in order to identify a matte value.

2. Apparatus for processing image data comprising storage means storing instructions, memory means for storing said instructions during execution and image data including foreground image data, processing means for performing image processing in which said foreground image data may be analysed to generate matte values for controlling a keying process in which said foreground image is to be composited against background image data, monitor means for facilitating user interaction with said image processing, wherein said processing means is configured such that, in response to said instructions, said foreground image data is processed by steps of:
receiving a user indication of a background color, said indication defining a tolerance color diamond in a plane of constant luminance, and a tolerance luminance range;
defining a tolerance transformation in response to said user indication of a background color;
receiving a user indication of a softness region, said indication defining a softness color diamond in a plane constant luminance, and a softness luminance range;
defining a softness transformation in response to said user indication of a softness region; and
processing pixels of said foreground image with said transformations in order to identify a matte value.

3. Apparatus according to claim 2, wherein said processing means is configurable in response to said instructions so that said tolerance transformation is defined by combining a color space transformation with said tolerance diamond and range.

4. Apparatus according to claim 2, wherein said processing means is configurable in response to said instructions such that said softness transformation is defined by combining a color space transformation with said softness diamond and range.

5. Apparatus according to claim 2, wherein said processing means is configurable by said instructions such that said transformations define normalised color spaces for tolerance and softness, and in said processing step, the matte value for a color located in the region between a softness and a tolerance color volume is generated by the steps of:
identifying the centre of said tolerance volume by co-ordinates for said normalised color space for softness; and
re-centering said softness volume to said tolerance centre without affecting its borders.

6. Apparatus according to claim 2, wherein said processing means configurable in response to said instructions such that an additional step is performed of receiving a user indication of a sharpness value.

7. Apparatus according to claim 6, wherein said processing means is configurable by said instructions such that said processing step combines said sharpness with said transformations in order to modify softness characteristics at the border of said tolerance volume.

8. Apparatus according to claim 2, wherein said processing means is configurable in response to said instructions such that a plurality of pairs of said transformations may be defined for a plurality of respective image frames in a clip.

9. Apparatus according to claim 8, wherein said processing means is configurable in response to said instructions such that additional transformations are generated by interpolating between said transformations.

10. Apparatus according to claim 9, wherein said processing means is configurable such that said interpolation is controlled by an animation curve.

11. A method of processing image data in an image processing system including memory means for storing instructions and image data including foreground image data, processing means for performing image processing in which said foreground image data is analysed to generate matte values for controlling a keying process in which said foreground image is to be composited against background image data, said instructions defining operations to be performed by said processing means to process said image data, wherein said operations include:
receiving a user indication of a background color, said indication defining a color diamond in a plane of constant luminance, and a luminance range;
defining a transformation in response to said user indication; and
processing pixels of said foreground image with said transformation in order to identify a matte value.

12. A method of processing image data in an image processing system including memory means for storing instructions and image data including foreground image data, processing means for performing image processing in which said foreground image data is analysed to generate matte values for controlling a keying process in which said foreground image is to be composited against background image data, said instructions defining operations to be performed by said processing means to process said image data, wherein said operations include steps of:

receiving a user indication of a background color, said indication defining a tolerance color diamond in a plane of constant luminance, and a tolerance luminance range;

defining a tolerance transformation in response to said user indication of a background color;

receiving a user indication of a softness region, said indication defining a softness color diamond in a plane of constant luminance, and a softness luminance range;

defining a softness transformation in response to said user indication of a softness region; and processing pixels of said foreground image with said transformations in order to identify a matte value.

13. A method according to claim 12, wherein said tolerance transformation is defined by combining a color space transformation with said tolerance diamond and range.

14. A method according to claim 12, wherein said softness transformation is defined by combining a color space transformation with said softness diamond and range.

15. A method according to claim 12, wherein said transformations define normalised color spaces for tolerance and softness, and in said processing step, the matte value for a color located in the region between a softness and a tolerance color volume is generated by the steps of:

identifying the centre of said tolerance volume by co-ordinates for said normalised color space for softness; and re-centering said softness volume to said tolerance centre without affecting it borders.

16. A method according to claim 12, including an additional step of receiving a user indication of a sharpness value.

17. A method according to claim 16, wherein said processing step combines said sharpness with said transformation in order to modify softness characteristics at the border of said tolerance volume.

18. A method according to claim 12, wherein a plurality of pairs of said transformations are defined for a plurality of respective image frames in a clip.

19. A method according to claim 18, wherein additional transformations generated by interpolating between said transformations.

20. A method according to claim 19, wherein said interpolation is controlled by an animation curve.

21. A computer-readable medium having computer-readable instructions executable by a computer configurable for image processing, said computer including memory means for storing said instructions and image data including foreground image data, processing means for performing image processing in which said foreground image data is analysed to generate matte values for controlling a keying process in which said foreground image is to be composited against background image data, said instructions defining operations to be performed by said processing means to process said image data, wherein said operations include:

receiving a user indication of a background color, said indication defining a color diamond in a plane of constant luminance, and a luminance range;

defining a transformation in response to said user indication; and processing pixels of said foreground image with said transformation in order to identify a matte value.

22. A computer-readable medium having computer-readable instructions executable by a computer configurable for image processing, said computer including memory means for storing said instructions and image data including foreground image data, processing means for performing image processing in which said foreground image data is analysed to generate matte values for controlling a keying process in which said foreground image is to be composited against background image data, said instructions defining operations to be performed by said processing means to process said image data, wherein said operations include steps of:

receiving a user indication of a background color, said indication defining a tolerance color diamond in a plane of constant luminance, and a tolerance luminance range;

defining a tolerance transformation in response to said user indication of a background color;

receiving a user indication of a softness region, said indication defining a softness color diamond in a plane of constant luminance, and a softness luminance range;

defining a softness transformation in response to said user indication of a softness region; and processing pixels of said foreground image with said transformations in order to identify a matte value.

23. A computer-readable medium according to claim 22, wherein said tolerance transformation is defined by combining a color space transformation with said tolerance diamond and range.

24. A computer-readable medium according to claim 22, wherein said softness transformation is defined by combining a color space transformation with said softness diamond and range.

25. A computer-readable medium according to claim 22, wherein said transformations define normalised color spaces for tolerance and softness, and in said processing step, the matte value for a color located in the region between a softness and a tolerance color volume is generated by the steps of:

identifying the centre of said tolerance volume by co-ordinates for said normalised color space for softness; and re-centering said softness volume to said tolerance centre without affecting its borders.

26. A computer-readable medium according to claim 22, including an additional step of receiving a user indication of a sharpness value.

27. A computer-readable medium according to claim 26, wherein said processing step combines and sharpness with said transformations in order to modify softness characteristics at the border of said tolerance volume.

28. A computer-readable medium according to claim 22, wherein a plurality of pairs of said transformations are defined for a plurality of respective image frames in a clip.

29. A computer-readable medium according to claim 28, wherein additional transformations are generated by interpolating between said transformations.

30. A computer-readable medium according to claim 29, wherein said interpolation is controlled by an animation curve.

* * * * *

UNITED STATES PATENT AND TRADEMARK OFFICE
CERTIFICATE OF CORRECTION

PATENT NO. : 6,751,347 B2 Page 1 of 1
DATED : June 15, 2004
INVENTOR(S) : Daniel Pettigrew et al.

It is certified that error appears in the above-identified patent and that said Letters Patent is hereby corrected as shown below:

<u>Column 14,</u>
Line 27, after "means" insert -- is --.

Signed and Sealed this

Thirtieth Day of November, 2004

JON W. DUDAS
*Director of the United States Patent and Trademark Office*